US010930925B2

United States Patent
Huang et al.

(10) Patent No.: US 10,930,925 B2
(45) Date of Patent: Feb. 23, 2021

(54) CONDUCTIVE COMPOSITES

(71) Applicant: ANTEO TECHNOLOGIES PTY LTD, Queensland (AU)

(72) Inventors: Chang-Yi Huang, Calamvale (AU); Nobuyoshi Joe Maeji, Eight Mile Plains (AU); Quansheng Song, Forest Lake (AU)

(73) Assignee: ANTEO TECHNOLOGIES PTY LTD, Queensland (AU)

( * ) Notice: Subject to any disclaimer, the term of this patent is extended or adjusted under 35 U.S.C. 154(b) by 113 days.

(21) Appl. No.: 16/089,594

(22) PCT Filed: Mar. 29, 2017

(86) PCT No.: PCT/AU2017/050269
§ 371 (c)(1),
(2) Date: Sep. 28, 2018

(87) PCT Pub. No.: WO2017/165916
PCT Pub. Date: Oct. 5, 2017

(65) Prior Publication Data
US 2019/0109325 A1   Apr. 11, 2019

(30) Foreign Application Priority Data

Mar. 29, 2016   (AU) ................................ 2016901140
Mar. 29, 2016   (AU) ................................ 2016901142

(51) Int. Cl.
*H01M 4/36*   (2006.01)
*H01M 4/62*   (2006.01)
(Continued)

(52) U.S. Cl.
CPC ............. *H01M 4/364* (2013.01); *H01M 4/36* (2013.01); *H01M 4/386* (2013.01); *H01M 4/505* (2013.01);
(Continued)

(58) Field of Classification Search
CPC ........ H01M 4/364; H01M 4/36; H01M 4/386; H01M 4/505; H01M 4/525; H01M 4/587; H01M 4/624; H01M 10/0525
See application file for complete search history.

(56) References Cited

U.S. PATENT DOCUMENTS

2005/0153206 A1 * 7/2005 Oesten ................. H01M 4/366
                                                                   429/232
2012/0156577 A1 * 6/2012 Bulovic .............. H01M 4/8803
                                                                   429/417
(Continued)

FOREIGN PATENT DOCUMENTS

EP   1689011   *   8/2006
EP   3286789       2/2018
(Continued)

OTHER PUBLICATIONS

International Search Report issued in International Application No. PCT/AU2017/050269, dated Jul. 28, 2017.
(Continued)

*Primary Examiner* — Lisa S Park
(74) *Attorney, Agent, or Firm* — Charles C. Achkar; Ostrolenk Faber LLP.

(57) ABSTRACT

The invention relates to formulations comprising: (i) a first active material; (ii) a second active material; and (iii) a metal-coordination complex, wherein the first active material and the second active material have at least one surface property which is different, one from the other. Such formulations are more homogenous than those formed without the metal-coordination complex and can be used to form composite materials, such as those forming part of a conductive interface, having advantageous properties and providing for improvement in functionality of the conductive interface.

22 Claims, 10 Drawing Sheets

(51) Int. Cl.
  *H01M 4/38*     (2006.01)
  *H01M 4/505*    (2010.01)
  *H01M 4/525*    (2010.01)
  *H01M 4/587*    (2010.01)
  *H01M 10/0525*  (2010.01)

(52) U.S. Cl.
  CPC ........... *H01M 4/525* (2013.01); *H01M 4/587* (2013.01); *H01M 4/624* (2013.01); *H01M 10/0525* (2013.01)

(56) References Cited

U.S. PATENT DOCUMENTS

| | | | | |
|---|---|---|---|---|
| 2012/0208080 A1* | 8/2012 | Park | ................. | H01M 10/0525 429/207 |
| 2012/0214973 A1* | 8/2012 | Muir | .................... | G01N 33/553 530/391.5 |
| 2017/0077503 A1* | 3/2017 | Erickson | ................. | H01M 4/62 |

FOREIGN PATENT DOCUMENTS

| | | |
|---|---|---|
| WO | WO 1997/049136 A1 | 12/1997 |
| WO | WO 2003/085755 A2 | 10/2003 |
| WO | WO 2016/168892 A1 | 10/2016 |

OTHER PUBLICATIONS

Written Opinion of the International Searching Authority issued in International Application No. PCT/AU2017/050269, dated Jul. 28, 2017.
International Preliminary Report on Patentability issued in International Application No. PCT/AU2017/050269, dated Oct. 2, 20118.
Supplementary European Search Report issued in counterpart Application No. 17 772 974.8, dated Nov. 4, 2019.
EPO Communication pursuant to Article 94(3) EPC issued in counterpart Application No. 17 772 974.8, dated Oct. 8, 2020.

* cited by examiner

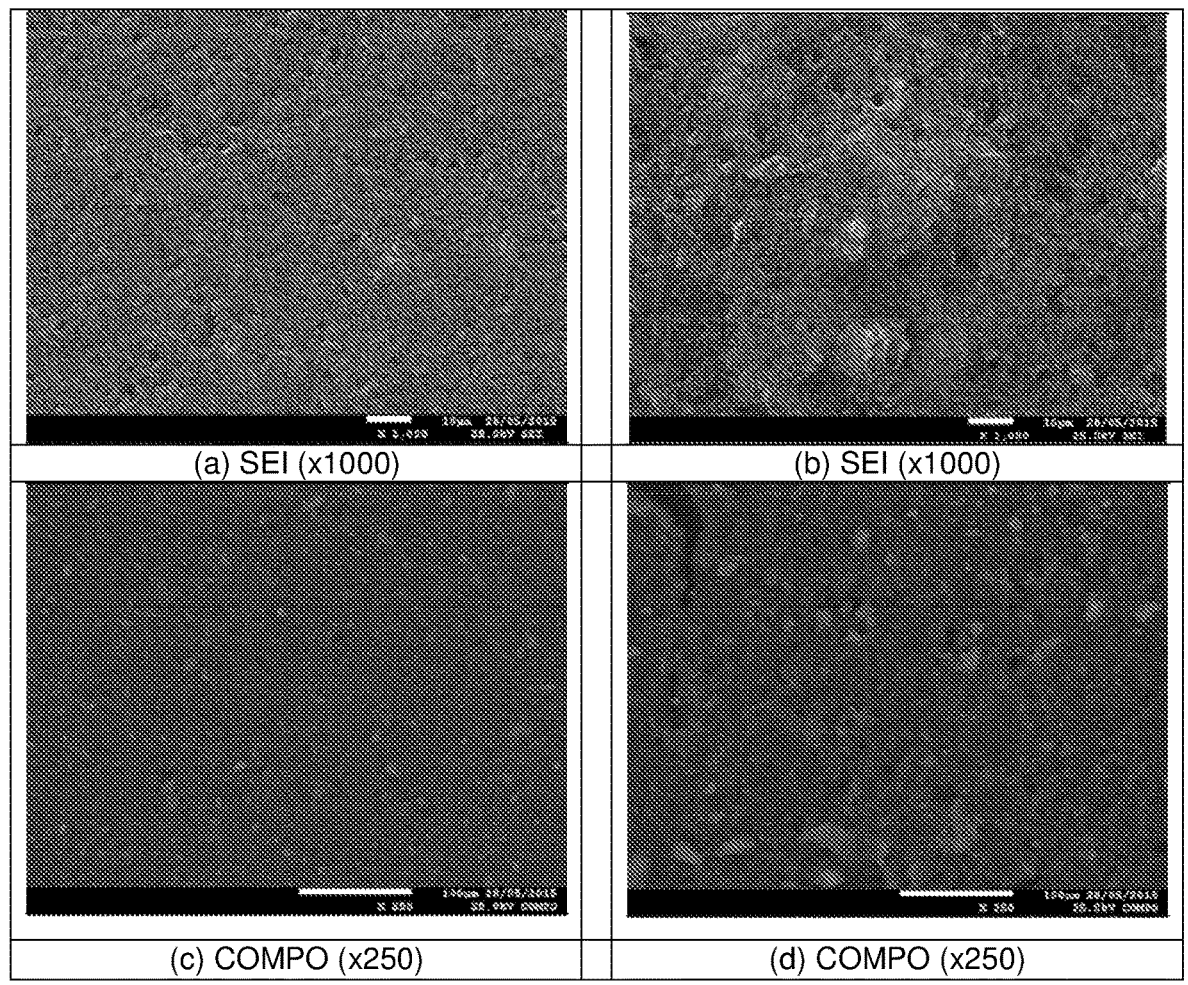
FIG 7 (a-d)

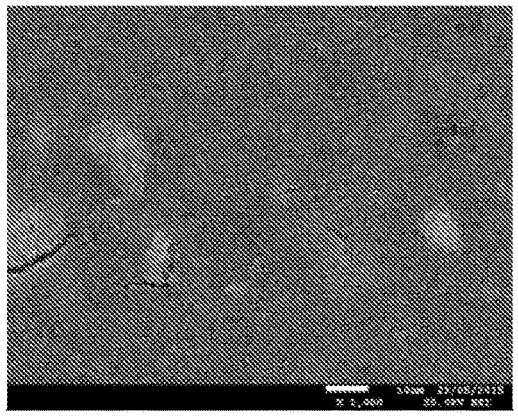
(a)
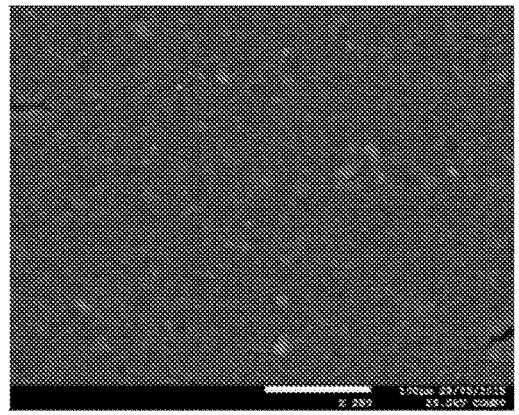
(b)
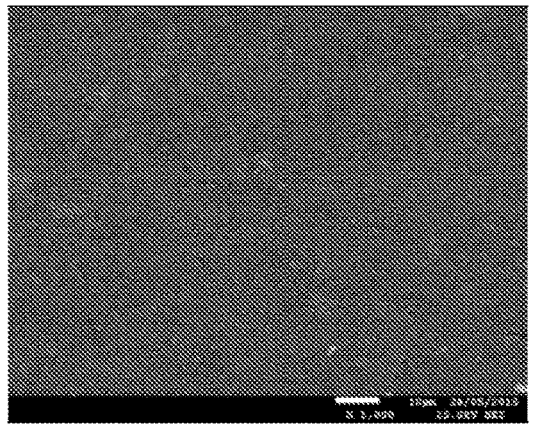
(c)
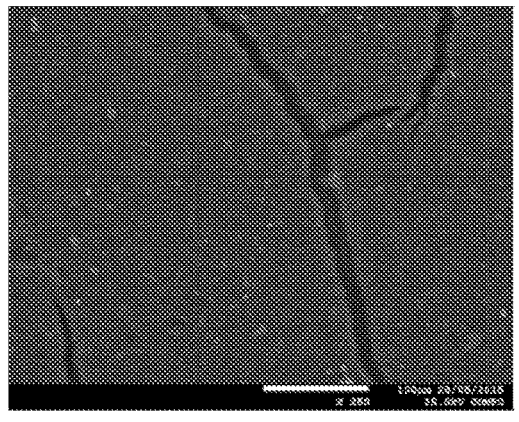
(d)
FIG 8 (a-d)

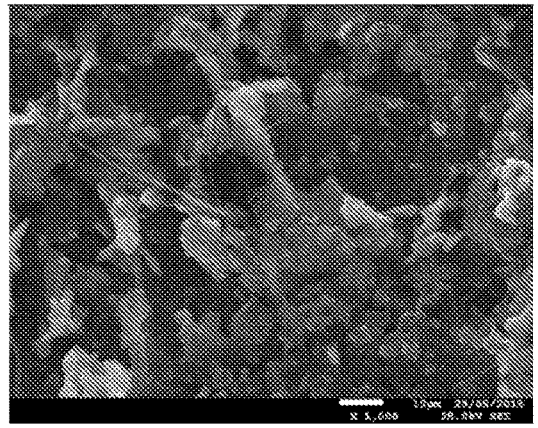
(a)
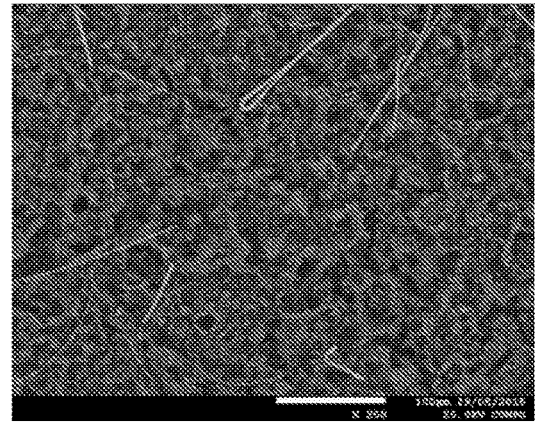
(b)
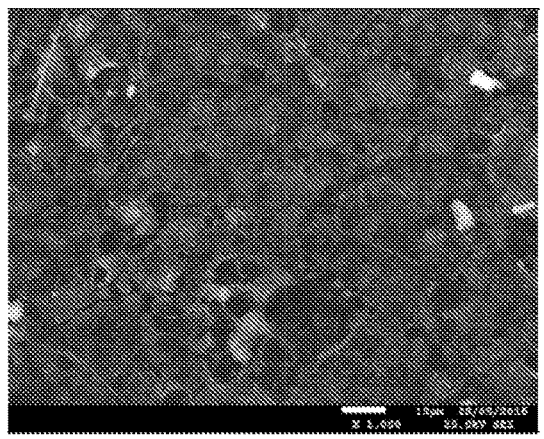
(c)
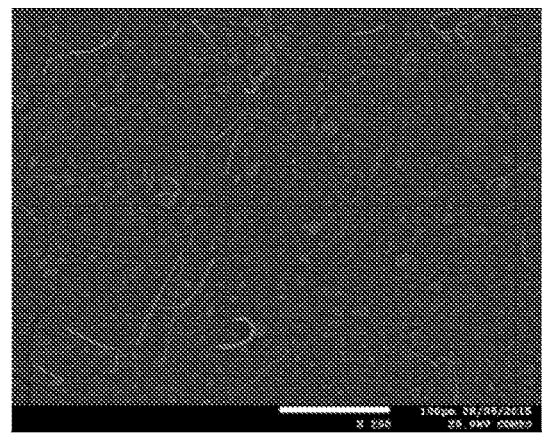
(d)
FIG 9 (a-d)

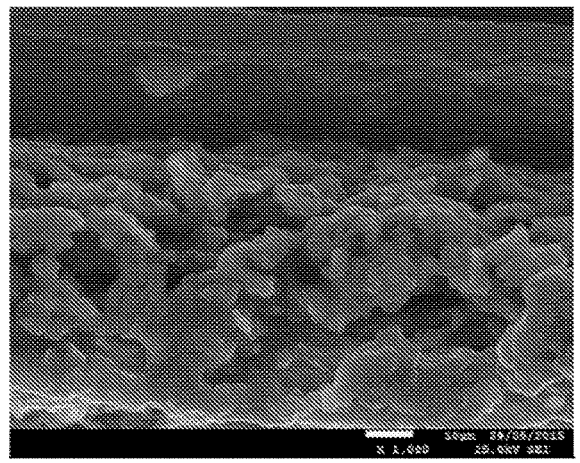
(a)
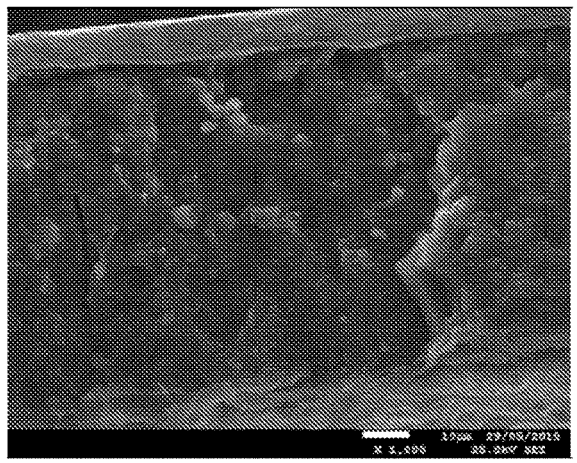
(b)
FIG 10 (a) and (b)
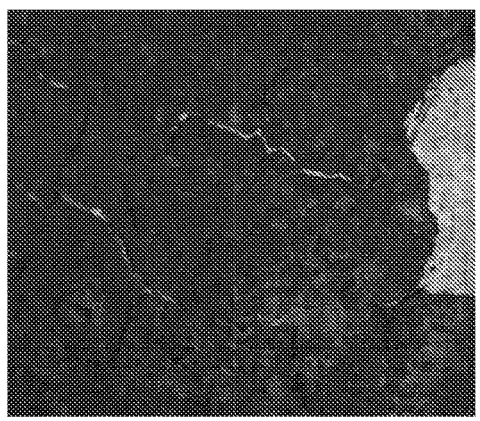
(a)
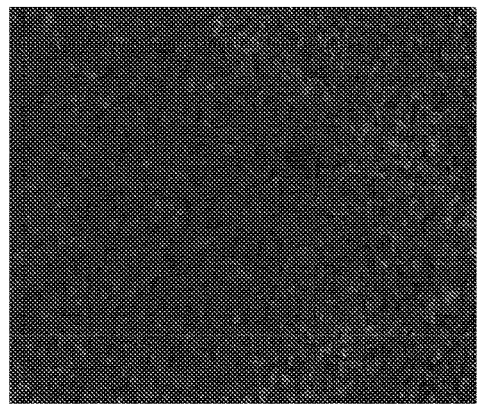
(b)
FIG 11 (a) and (b)

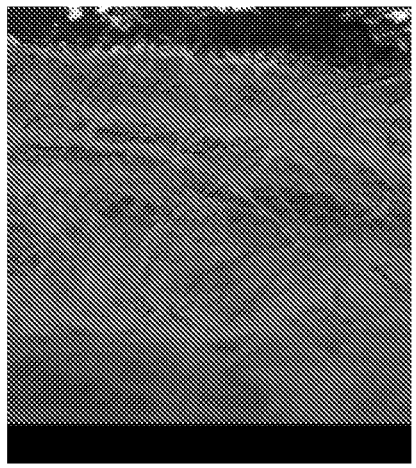
a. SEI x100
b. SEI x100
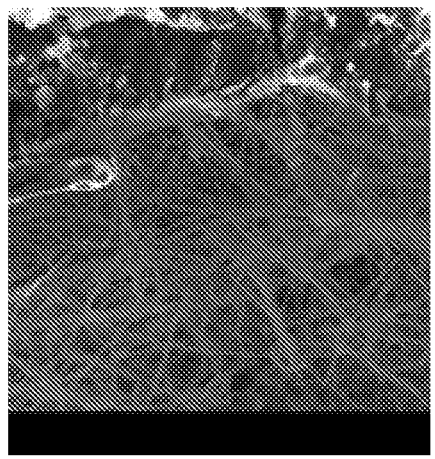
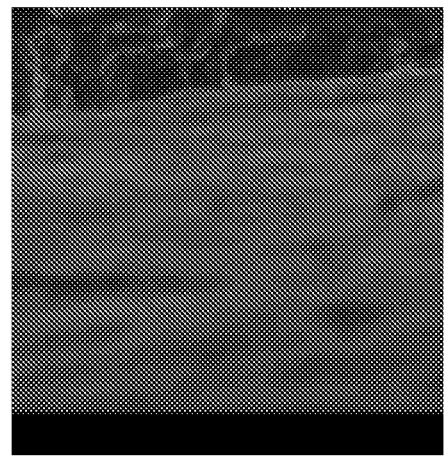
c. SEI x250
d. SEI x 250
FIG 12 (a-d)

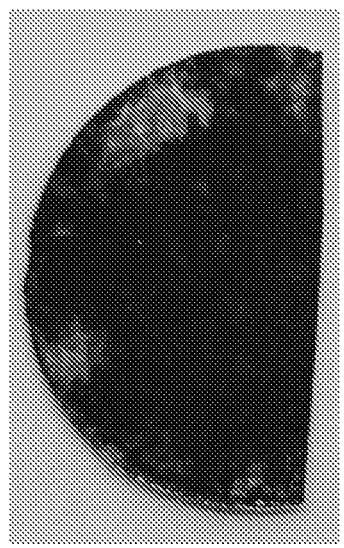 
FIG 13 (a) and (b)
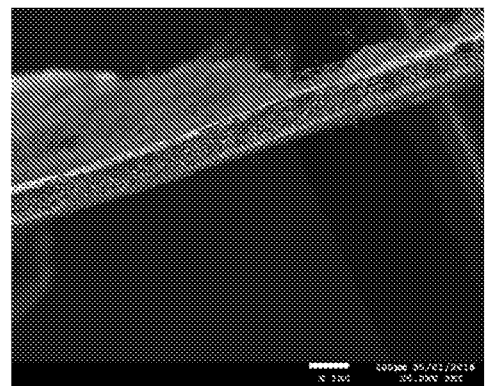 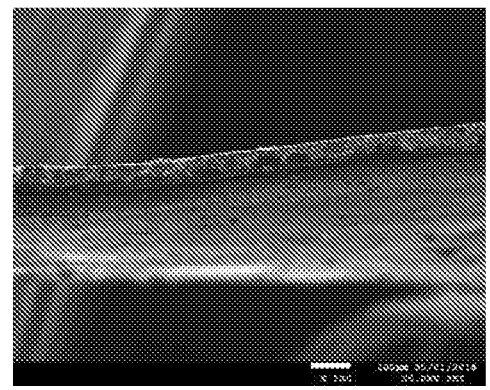
FIG 14 (a) and (b)

CONDUCTIVE COMPOSITES

CROSS REFERENCE TO RELATED APPLICATIONS

The present application is a § 371 National Phase application based on PCT/AU2017/050269 filed Mar. 29, 2017, which claims the benefit of Australian application No. 2016901140 filed Mar. 29, 2016 and Australian application No. 2016901142 filed Mar. 29, 2016 the subject matter of each of which is incorporated by reference in their entirety.

FIELD OF THE INVENTION

The invention relates to the field of composite formulations and composite articles formed therefrom. In particular, the invention relates to forming conductively contiguous structures, methods for preparing same, and their use for preparing, maintaining and controlling conductive interfaces.

BACKGROUND OF THE INVENTION

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

Electron and/or ion flow between different materials is the basis of any energy storage and conversion system. To meet the need for higher energy and power densities and to provide other benefits including longer cycle life, the development of new anode and cathode materials is considered essential. New material compositions and doping methods, different micro- and nano-structures/shapes, and the use of surface coatings are all active research areas in the drive to provide for improved performance of the active materials employed in such energy storage and conversion systems. However, this is not the only issue to be considered when producing, for example, higher performing batteries. Batteries function due to electron and ion flow across interfaces formed by different materials and, at each interface, it is crucial to facilitate this flow and maintain good conductance. Maintaining such functionally effective interfaces between current collectors, such as aluminium (cathodes) and copper (anodes) and their respective active material coatings, is critical for performance and improved operational lifetime.

Similarly, maintaining functionally effective interfaces between different components that constitute active material coatings is also critical for performance and improved operational lifetime. An interface exists when two "phases" form a boundary, and the manner in which these two phases mix together will depend on their surface chemistry and the degree to which this interface exists per unit volume. In the case where nano- and micro-particles are involved, particle size and distribution, shape and morphology, as well as total surface area and porosity are core determinates of mixing. Additionally, surface chemistry of particles including the presence or absence of surface charge, density and distribution, as well as the overall hydrophobic to hydrophilic balance are another set of core parameters. Together, these factors determine the degree to which different particles will form uniformly dispersed or poorly dispersed systems. Forming homogeneous mixtures of different nano-size and micron-sized particles in different solvents, (organic as well as aqueous) is therefore far from a trivial process.

With smaller particles, the ratio of surface area/volume increases such that that the surface properties become crucial, influencing both interfacial properties and aggregation behavior. Where two or more different particles having distinctly different surface properties are involved, formation of homogeneous composites is especially challenging. High shear forces are required to break up the aggregated like particles and to encourage maximum homogeneity, which both further complicates the process and increases the costs of reproducibly creating composite formulations with desired properties.

In the field of nanocomposites, or multiphase materials that can provide unique or otherwise difficult to attain properties, it is critical to obtain good homogeneity across or within composite particles, tapes, tubes, sheets, and other structural components. One example of such composites is seen in the development of electromaterials for batteries or capacitors and supercapacitors, as well as other energy storage and conversion systems. Materials comprising mixtures of silicon and carbon nanoparticles with binders such as polyacrylic acids, in pre-determined ratios, are required for next generation anodes. Different silicon materials such as alloys, core-shell structures, porous structures, and nanostructures are being developed, each having different surface chemistries. Additionally, different carbon materials in the form of graphite, super-P carbon, graphene, carbon nanotubes, carbon nanofibers, acetylene carbon black, and Ketjenblack (KB) are available as desirable inclusions into certain composite materials. All of these materials can end up presenting a broad spectrum of hydrophobicity to hydrophilicity characteristics and simple methods to create reliably and predictably homogeneous mixtures from such diverse materials are not commonly available. One example of such materials is in the general area of conductive nanocomposites which are useful in a wide variety of industrial applications. Conductive composites can be used for electro-optical devices, electrostatic discharge, conductive paints, and lightning strike protections amongst others. The present invention addresses at least some of the aforementioned shortcomings of the prior art.

SUMMARY OF THE INVENTION

The present invention is predicated, at least in part, on the finding that particles of different surface, charge, size, hydrophobicity and other properties can be advantageously mixed to form more reliably homogeneous composite precursor formulations in the presence of certain metal-coordination complexes which results in improved properties in the subsequently formed composite material. One such key application is the presence of metal-coordination complexes in conductive composite active material interfaces which has a number of benefits over the use of uncoated active materials, current collectors or other material interfaces. The use of the metal-coordination complex as a binder or coating at conductive interfaces formed by such composite materials provide an improved adhesion layer, in terms of strength and stability, and provides for a more effective conductive interface. Without wishing to be bound by theory, the inventors believe that metal-coordination complexes can act to minimise aggregation of nano- and micron-size active material to thereby improve dispersity and interaction in mixtures comprising different active materials, which have different surface properties, and thus forming more dispersed and well distributed composite precursor formulations and composite materials formed therefrom.

In a first aspect, although not necessarily the broadest aspect, the invention resides in a composite precursor formulation comprising: (i) a first active material; (ii) a second active material; and (iii) a metal-coordination complex, wherein the first active material and the second active material have at least one surface property which is different, one from the other.

In one embodiment, the composite precursor formulation may further comprise a liquid carrier.

The liquid carrier may be an aqueous or organic solvent, or mixture thereof, or the liquid carrier may be a liquid additional active material.

In a second aspect, the invention resides in a method of producing a composite precursor formulation including the steps of: (i) providing a first and a second active material, wherein the first active material and the second active material have at least one surface property which is different, one from the other; (ii) providing a metal-coordination complex; and (iii) combining the first and second active materials and the metal-coordination complex to thereby form the composite precursor formulation.

In one embodiment, the method may further include the step of agitating the combined mixture of first and second active materials and metal-coordination complex.

In a third aspect, the invention resides in a composite material comprising: (i) a first active material; (ii) a second active material; and (iii) a metal-coordination complex bound or otherwise associated with the first and second active materials, wherein the first active material and the second active material, prior to being formed into the composite material, have at least one surface property which is different, one from the other.

In one embodiment of the above aspect, the metal-coordination complex is associated with the first and second active materials via an intermediary agent, such as, for example, a binder.

In some embodiments wherein the composite precursor formulation comprises a liquid carrier then the method may further include the step of removing the liquid carrier.

In a fourth aspect, the invention resides in a method of forming a conductive interface between two or more active materials, or between at least one active material and a substrate including the steps of: (i) contacting at least one of the active materials and/or the substrate with a metal-coordination complex; and (ii) mixing the active materials or mixing or coating the substrate with the at least one active material, to thereby form the conductive interface, and wherein at least two of the active materials or one of the active materials and the substrate have at least one surface property which is different, one from the other.

The conductive interface may be formed at least in part from the composite precursor formulation of the first aspect or the composite material of the third aspect.

In a fifth aspect, the invention resides in a conductive interface comprising (i) an active material composite comprising at least two active materials and a metal-coordination complex in contact with the active materials; or (ii) an active material mixed with or coated onto a substrate and a metal-coordination complex in contact with the active material and/or the substrate.

In any embodiment of the fourth and fifth aspects, the conductive interface is one which provides for the flow of electrons and/or ions therethrough.

In one embodiment of the fourth and fifth aspects, the conductive interface is part of an electrode or a semiconductor.

Prior to forming the conductive interface, at least two of the active materials, have at least one surface property which is different, one from the other In one embodiment, the substrate may be a separator.

Preferably, the conductive interface of the fifth aspect is formed by the method of the fourth aspect.

In a sixth aspect, the invention resides in a method of fabricating an electrode comprising a conductive interface, the method including the steps of (i) providing an electrode substrate and an active material; (ii) contacting one or both of the electrode substrate and the active material with a metal-coordination complex; and (iii) coating the electrode substrate with the active material, to thereby form the electrode.

The conductive interface of the electrode may be formed at least in part from the composite precursor formulation of the first aspect or the composite material of the third aspect or the method of the fourth aspect.

The various features and embodiments of the present invention, referred to in individual sections above apply, as appropriate, to other sections, mutatis mutandis. Consequently features specified in one section may be combined with features specified in other sections as appropriate.

Further features and advantages of the present invention will become apparent from the following detailed description.

BRIEF DESCRIPTION OF THE DRAWINGS

FIG. 7 a-d is a series of SEM images of silicon (100 nm) and carbon composite precursor formulations with metal-coordination complexes, (a) SEI×1000, (c) COMPO×250 magnification and, without metal-coordination complexes, (b) SEI×1000, (d) COMPO×250 magnification;

FIG. 8 a-d is a series of SEM images showing differences in surface morphology and electrode structure for Si (100 nm) electrode samples with (c and d) and without (a and b) metal-coordination complex (samples have not gone through charge/discharge cycles);

FIG. 9 a-d is a series of SEM images showing the differences in surface morphology and electrode structure for Si (100 nm) electrode samples with (c and d) and without (a and b) metal-coordination complex after hundreds of deep charge/discharge cycles;

FIGS. 10 (a) and (b) are cross section SEM images of (a) a copper foil and active material interface formed without metal-coordination complex and (b) a copper foil and active material interface formed in a similar manner but including metal-coordination complex with the SEM images taken from dismantled half coin cells after 1000 deep charge and discharge cycles at 0.5 C, 1 C=4,200 mAh/g;

FIGS. 11 (a) and (b) are photographs of (a) a dismantled electrode formed without metal-coordination complex and (b) a dismantled electrode formed in a similar manner but including metal-coordination complex, with the photographs taken of those components from dismantled half coin cells after 1000 deep charge and discharge cycles at 0.5 C, 1 C=4,200 mAh/g;

FIGS. 12 (a), (b), (c) and (d) are SEM images of (a) 100×, (c) 250×, SEI mode of a dismantled electrode formed with metal-coordination complex and (b) 100×, (d) 250×SEI mode of a dismantled electrode formed in a similar manner but without metal-coordination complex with the images taken of the electrodes from dismantled half coin cells after 1000 deep charge and discharge cycles at 0.5 C, 1 C=4,200 mAh/g. The images on samples with metal-coordination complex display a hair-like structure corresponding to the battery separator made of fibres of polypropylene/polyethylene. In contrast, little or no separator fibres were observed when metal-coordination complex was not used;

FIGS. 13 (a) and (b) are photographs of LiNiCoMnO2 materials with metal-coordination complex (a) and control samples (b) from dismantled half coin cells after 1000 deep charge and discharge cycles (at 0.5 C, 1 C=150 mAh/g); and FIGS. 14 (a) and (b) are SEM images of LiNiCoMnO2 materials at 100×SEI mode of a dismantled electrode formed (a) with metal-coordination complex and (b) without metal-coordination complex.

Figure 1:
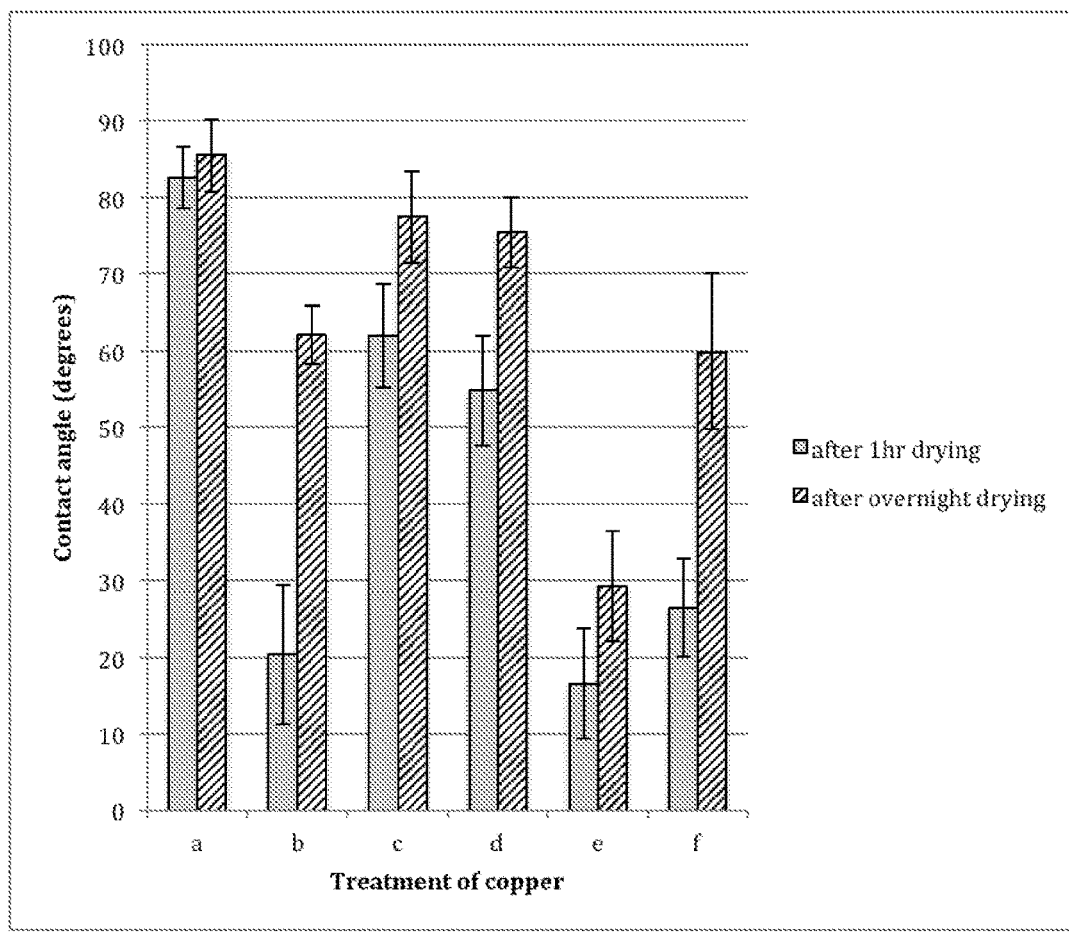
FIG. 1 is a set of Contact Angle (θ) measurements performed on copper current collectors as follows, a. Control 1 (treated with water instead of metal-coordination complex, b. treated with metal-coordination complex at pH 4.5, c. treated with metal-coordination complex at pH 5.0, d. Control 2 (treated with water instead of metal-coordination complex and polyacrylic acid (PAA), e. treated with metal-coordination complex at pH 4.5, and PAA f. treated with metal-coordination complex at pH 5.0, and PAA.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

In a first aspect, the invention resides in a composite precursor formulation comprising: (i) a first active material; (ii) a second active material; and (iii) a metal-coordination complex, wherein the first active material and the second active material have at least one surface property which is different, one from the other.

The terms composite or nanocomposite are intended to encompass any mixture of metallic, intermetallic, metalloids, carbon, ceramic and/or polymeric materials. When mixed initially to form uniformly dispersed suspensions, slurries or blends prior to formation of the final composite article or material, the dry or liquid-based mixtures are referred to herein as composite precursor formulations. When these formulations are converted into the final article or material they are referred to herein as composite materials or articles or conductive interfaces formed using such composite materials.

The term "active material" as used herein may, but does not necessarily, imply an active functional role for conductivity in the final composite material and/or conductive interface comprising same. Additionally or instead, the active material may contribute to the strength, elasticity, or partitioning properties of the composite material. Alternatively, the active role of the active material may be within the composite precursor formulation only, prior to formation of the composite material. Preferably, at least one active material will contribute significantly to conductivity. In one non-limiting example, the active material may be a material such as silicon and/or graphite or other carbon particle which is a component of a conductive interface, such as an electrode. Therefore, in one embodiment, the active material (first, second or additional) may be particulate.

The term homogeneous is generally intended to describe well dispersed and well distributed first and second active materials forming the composite precursor formulation.

The term "conductive interface" is intended to encompass any arrangement of active material (first and/or second) and/or substrate wherein one material is immediately adjacent to another material. In some embodiments, the interface presents one contiguous material which is immediately adjacent to another material which may be contiguous or not. Either the active material or the substrate may be the contiguous or non-contiguous material. In certain embodiments, the conductive interface will be one which allows for or facilitates the flow of ions and/or electrons. One non-limiting example of such a conductive interface is the interface between active materials such as silicon, carbon, binders or mixed metal oxides, or between such active materials and the underlying current collector on which they are coated, such as copper or aluminium. Another example is in the formation of a semi-conductive interface between a semiconductor material and a suitable substrate.

In one embodiment, the first and second active materials are different, one from the other, in that at least one surface property of one is substantially different from that same surface property in the other active material. The surface properties which may vary between active materials may present in terms of overall surface charge, density and distribution as well as size and distribution, hydrophobicity/hydrophilicity, zeta potential and the like such that the first and second active materials do not easily disperse within each other. One non-limiting example is where the surface properties of one active material result in a predominantly or substantially hydrophobic surface and the other presents a predominantly or substantially hydrophilic surface.

In an embodiment, the first and/or second active material of the composite precursor formulation is selected from the group consisting of metals, metal oxides, ceramics, intermetallic compounds, metalloids, clays, carbon and both synthetic and biological polymers. In certain embodiments, silicon is a preferred metalloid.

In one non-limiting embodiment, wherein a composite material to be formed from the composite precursor formulation is to form part of an electrode, or other conductive interface, and particularly an anode, the first and/or second active material is selected from one or more of silicon, tin and carbon. The silicon may be in the form of pure silicon, its various oxides (SiO, $SiO_2$, etc.), its alloys (Si—Al, Si—Sn, etc.), and composites (Si—C, Si-graphene, etc.). Similarly, tin may also be in any one or more of its various suitable forms. It is preferred that the carbon is in the form of one or more carbon particles selected from one or more of graphite, super-P carbon, graphene, carbon nanotubes, carbon nanofibers, acetylene carbon black, and Ketjenblack (KB). Preferably, the carbon is in the form of graphite.

Preferably, when the electrode is a cathode, the first and/or second active material is selected from one or more of sulphur, $LiFePO_4$ (LFP), mixed metal oxides containing cobalt, lithium, nickel, iron and/or manganese, and carbon. It is preferred that the carbon is in the form of one or more carbon particles selected from one or more of graphite, super-P carbon, graphene, carbon nanotubes, carbon nanofibers, acetylene carbon black, and Ketjenblack (KB). Preferably, the carbon is in the form of graphite.

The composite precursor formulation may comprise one or more additional active materials, as is required to form the composite material, and each additional active material thereof may be selected from the same groups and materials described for the first and second active materials. For example, the composite precursor formulation may further comprise a third active material, a fourth active material, a fifth active material and so on.

The first and second active materials, and any additional active materials, may be of any shape including particles, tubes, threads, nanocages, nanocomposite, nanofabrics, nanofiber, nanoflake, nanoflower, nanofoam, nanomesh, box-shaped, nanoparticle, nanopillar, nanopin film, nanoplatelet, nanoribbon, nanoring, nanorod, nanosheet, nanoshell, nanotip, quantum dot, quantum heterostructure and sculptured thin film. Whatever the shape or morphology of the first and second, or additional, active materials at least two thereof will have at least one surface property which is different, one from the other, such that each typically, and particularly in the absence of the metal-coordination complex, will have the tendency to aggregate with itself as opposed to forming a homogeneous composite.

In one embodiment, the additional active material may be selected from a polar or non-polar polymer.

Such polar and non-polar polymers may be miscible in aqueous or organic solvent environments. It will be appreciated that with such polymers, if the molecular weight increases above a threshold value then the polymer will be a solid and, in such embodiments, the composite precursor formulation may be a dry mixture i.e. there may be no liquid carrier.

It will therefore be appreciated that the first and second active materials, and any additional active materials, may be mixed, in the presence of the metal-coordination complex, in a dry mixed environment, a fluid environment, an aqueous solvent environment, and organic solvent environment, or a mixture thereof.

A dry mixed environment may come about, in one embodiment, when a high molecular weight polymer is present as one of the first or second active material or an additional component of the formulation. Alternatively, the mixing in a dry mixed environment may come about as one of the first or second active materials may be contacted with the metal-coordination complex in a liquid environment and this subsequently dried down. The first or second active material coated with the metal-coordination complex can then be dry mixed with the non-coated first or second active material. Therefore, while the metal-coordination complex itself should be applied in a liquid environment provided by a liquid carrier, it is possible for the first and second active materials to be dry mixed in the presence of the metal-coordination complex which will previously have been coated onto one or both of those active materials in a liquid environment. Such an approach is considered to be within the scope of the present claims.

A fluid environment may come about, in one embodiment, when a heated liquid polymer is present as one of the first or second active material or an additional material of the formulation. Alternatively, the fluid environment may come about, in one embodiment, through the inclusion of a liquid carrier in the formulation. When a liquid polymer is one of the first or second active materials then the other active material will display at least one different surface property from the liquid polymer and will tend to aggregate therein without the addition of the metal-coordination complex.

The use of the metal-coordination complex in the formation of composite precursor formulations and composite materials formed therefrom can, in this aspect, be thought of as use of a mixing enhancer that improves homogeneity of the mixture or slurry and, additionally, may improve the desired properties of devices which require the use of the composite or nanocomposite material thereby formed. Particularly conductive composite or nanocomposite materials. Examples of such composite materials are mixtures of active materials used in conductive interfaces such as in electrodes, for example in batteries, and supercapacitors. Homogeneous slurries, e.g., comprising silicon and carbon particles, with other active materials such as one or more binders, are required to make the composites which are necessary for improved performance of anodes including higher energy densities, faster charge and discharge cycles, and to provide a longer operational cycle life. Obviously, poor homogeneity of slurries will lead to poor active composite materials and/or poor conductive interfaces and, consequently, less than optimal performance of this type of anode, and hence reduced overall performance of the battery.

In an embodiment, the layer of metal-coordination complex binding to the surface of the first and/or second active material particles acts to minimise aggregates and/or agglomerates between particles and encourages homogeneity within the formulation. Bridging between different active materials within the composites or nanocomposites may result from metal-coordination complex bonding to or directly associating with the different particles, or indirectly through interaction between the metal-coordination complex with a further component of the formulation, such as the bulk matrix.

In this regard, a bridging interaction may occur between the active material particles and the bulk matrix via the metal-coordination complex. In one embodiment the matrix may be a metal, ceramic or polymer that exists as a continuous phase in which first and second active material particles or fillers are embedded. Such matrices may have individual components which may be referred to herein as intermediary agents. In certain embodiments, such matrices and intermediary agents may be binders. Thus, in certain embodiments, a metal-coordination complex bonded to or associated with a first or second active material also includes a dative bond to an intermediary agent such as a binder moiety. Preferred binder moieties may be selected from carbene, a nitrogen-containing group, an oxygen-containing group, and a sulfur-containing group. More preferably the binder moiety is an oxygen-containing group. Most preferably, the binder moiety is selected from at least one of a carboxyl, a hydroxyl, and a carbonyl. The metal-coordination complex may present a surface to form a dative bond with any adjacent particle, filler, matrix or binder material and first or second active materials and bridge any one of such materials to any one or more of the others.

In an embodiment when a binder is included, the binder may be a polymer. In embodiments where it is desirable to form a dative bond between the metal-coordination complex and the binder, preferred polymers are those comprising oxygen species selected from acrylate, carboxyl, hydroxyl, and carbonyl moieties. These groups are able to form dative bonds with metal ions. However, other polymers without these groups may also be useful depending on the specific criteria, for example suitable polymers may be polyvinylidene fluoride (PVDF) or styrene butadiene rubber. In any event, where a dative bond is desired between the metal-coordination complex and the binder, it is even more preferable that the binder is selected from polyvinylpyrrolidone, carboxymethylcellulose, polyacrylic acid (PAA), poly (methacrylic acid), maleic anhydride copolymers including poly(ethylene and maleic anhydride) copolymers, polyvinyl alcohol, carboxymethyl chitosan, natural polysaccharide, Xanthan gum, alginate, and polyimide. Most preferably, the binder is PAA. In an alternative embodiment, where it is desirable that the binder moiety contains a nitrogen atom, a suitable polymer is polyacrylonitrile.

It will be clear to the skilled addressee that the proportions of the different components of the composites are not a limitation to formation of homogeneous composite precursor formulations. At one extreme, relatively low percentages of first and/or second active materials as nanoparticles/nanofillers can be added to the bulk matrix. At the other extreme, one, two, three or more different types of active material may comprise the bulk of the composite precursor formulation. In the latter case, complementary binders may be a relatively low percentage of the composite. In one embodiment, binders are not required in the formation of metal-coordination complex mediated composites.

The terms 'particle' or 'particulate' are generally intended to encompass a range of different shaped materials. The particle may be of any shape, such as but not limited to, spheres, cylinders, rods, wires, tubes. The particles may be porous or non-porous.

Preferably, the particles of the first and/or second active materials are nano- or micron-sized. The term "nano-sized" is intended to encompass a number average particle diameter of from about 1 nm to about 1000 nm. The term "micron-sized" is intended to encompass a number average particle diameter of from about 1 μm (1000 nm) to about 50 μm (50,000 nm). In the case of "nano-sized" particles, the particles of the first and/or second active materials are nanoshaped particulate materials such as nanoparticles, carbon, silicon or other nanotubes, graphene sheets, silicon, carbon and other nanocomposites, nanorods, nanowires, nano arrays, nano core-shell structures and other hollow nano-structures. It is generally preferred that the particle is substantially spherical in shape but according to the shape, it can be appreciated that distribution of such nano-size materials within composites and precursor formulations will vary given some constant mixing conditions. With smaller and smaller particles, the ratio of surface/volume increases affecting interfacial properties and aggregation behavior.

Preferably, the particles of the first and/or second active materials have a number average particle diameter of at least 10 nm. More preferably, the particles have a number average particle diameter of at least 30 nm. Even more preferably, the particles have a number average particle diameter of at least 50 nm. Most preferably, the particles have a number average particle diameter of at least 70 nm.

Preferably, the particles first and/or second active materials have a number average particle diameter of up to 50,000 nm. More preferably, the particles have a number average particle diameter of up to 10,000 nm. Even more preferably, the particles have a number average particle diameter of up to 5000 nm. Most preferably, the particles have a number average particle diameter of up to 3000 nm.

It will be understood that the particles have a number average diameter that has a lower range selected from any one of about 1, 10, 30, 50, or 70 nm; and an upper range that is selected from any one of about 50,000, 10,000, 5000, or 3000 nm. Most preferably, the number average diameter is within the range of 100 nm to 5,000 nm according to the desired improvements.

It will also be understood that composite precursor formulations and composite materials are contemplated other than those in which the first and/or second active materials are provided as a solid particulate. For example, the active materials may have a porous or fibrous structure. In this embodiment, the surface of the active material is at least partially coated by the metal-coordination complex.

In still other embodiments, the surface of the first and/or second active materials exhibits nano-structured or nano-patterned features. The term 'nano-patterned' is intended to encompass features that are in the size range of 1 to 1000 nm. In these embodiments the surface of these nano-structure or nano-patterned features are at least partially coated with the metal-coordination complex.

In one embodiment, the composite precursor formulation may further comprise a liquid carrier.

The liquid carrier may be an aqueous or organic solvent, or mixture thereof, or the liquid carrier may be a liquid additional active material.

In one embodiment, the liquid carrier is an aqueous or organic solvent-based liquid carrier. The nature of the liquid carrier is not particularly limiting on the scope of the present invention as a wide array of liquid solvents will be appropriate for different active materials. In certain embodiments, liquid (at room temperature) ketones, alcohols, aldehydes, halogenated solvents and ethers may be appropriate. In one preferred embodiment, an alcohol or aqueous/alcohol liquid carrier is preferred. Such alcohols as may be appropriate include methanol, ethanol, and isopropanol.

It is thought that the layer of the metal-coordination complex which forms on or around the first and/or second active materials, acts to improve the dispersion and distribution of the various materials and optional other components of the composite precursor formulation during mixing. In one embodiment, this mixing forms a dative bond with functional groups that can act as a ligand on the surfaces of the first and/or second active materials. The metal-coordination complex coating changes the surface chemistry of the first and/or second active materials, such as presence or absence of surface charge, density and distribution, and overall hydrophobic and hydrophilic balance, so as to minimize any interfacial differences between the two.

Improving the dispersion and distribution of the first and/or second active materials within composite precursor formulations and so within the composite material thereby formed, is shown herein to give enhancements, in one embodiment, in battery performance such as providing higher energy densities, faster charge and discharge cycles, and providing a longer cycle life. It will be appreciated, however, that the invention is not limited only to use in forming composite material for electrodes but rather has more general applicability in encouraging the formation of homogeneous conductive composite precursor formulations comprising a wide range of first and/or second active materials which are of differing character such that they otherwise do not naturally form a homogeneous mixture.

Where the surface chemistry of the first and/or second active materials needs to be converted to be more hydrophobic then a coordinating ligand can be made available on the metal-coordination complex which can be a conductive hydrophobic ligand (R—X), where X coordinates to the metal ion and so where X may be any electron-donating group that is able to form a co-ordination bond with the metal ion. To assist in forming a more hydrophobic surface chemistry, "R" is required to be a hydrophobic group that is preferably also potentially conductive and any conjugated polymers, short chain versions of such polymers, or polyconjugated small molecules can act as hydrophobic ligands for binding the metal-coordination complex to the hydrophobic surface, wherein the hydrophobic/conductive ligand binds to the hydrophobic surface by non-covalent and non-coordinative interactions, and the residual metal co-ordination sites are available to present a coordination layer to bind the conductive material. Alternatively, these short chain versions of such polymers or small molecules can act as conductive interfaces between the metal-coordination complex and the conductive material.

Examples of such polymers are polyacetylenes, polypyrroles, polyanilines, poly(p-phenylene vinylene), poly(alkylthiophenes), poly(3,4-ethyylenedioxythiophene), polycarbazoles, polyindols, polyazepines, polyfluorenes, polyphenylenes, polypyrenes, polyazulenes, polynaphthalenes and their copolymers. Small molecule precursors of these polymers and copolymers, and shorter oligomeric unit (di-, tri-, tetra-, penta-, hexa-, hepta-, octamer, etc) are preferred.

It will be appreciated from the above description of the first aspect that, while not so limited, it is preferred that the first and second active materials are materials which can combine to form a conductive composite material, such as a material suitable for forming a conductive interface such as, by way of example, an electrode.

In a second aspect, the invention resides in a method of producing a composite precursor formulation including the steps of: (i) providing a first and a second active material, wherein the first active material and the second active material have at least one surface property which is different, one from the other; (ii) providing a metal-coordination complex; and (iii) combining the first and second active materials and the metal-coordination complex to thereby form the composite precursor formulation.

The first and second active materials and the metal-coordination complex may be dry mixed, as previously described.

In one alternative embodiment, the method includes the step of combining the first and second active materials and the metal-coordination complex in a liquid carrier.

The liquid carrier may be as previously described for the first aspect.

In one embodiment, the method may further include the step of agitating the combined mixture of first and second active materials and metal-coordination complex.

The agitating may be shaking, mechanical mixing, rotating, stirring, centrifuging and the like.

It will be appreciated that the first and second active materials may be added to the liquid carrier in any order and either none, one or both may be present in the liquid carrier when the metal-coordination complex is added thereto. That is, so long as the first and second active materials come into contact with the metal-coordination complex while in the liquid carrier then a suitable homogeneous composite precursor formulation may result, whatever the order of addition.

In certain embodiments, the metal-coordination complex is applied to the particles of the first and/or second active materials prior to any aggregation, in which case at least a portion of the surfaces of the particles of the first and/or second active materials are coated with the metal-coordination complex. Preferably, the particles are encapsulated by the metal-coordination complex.

In an alternative embodiment, the metal-coordination complex may be introduced after mixing and aggregation of at least some of the particles of one of the first and/or second active materials. In this case, at least a portion of the surfaces of the other particles of the first and/or second active materials are coated with the metal-coordination complex. Preferably, the other particles are encapsulated by the metal-coordination complex.

In a third aspect, the invention resides in a composite material comprising: (i) a first active material; (ii) a second active material; and (iii) a metal-coordination complex bound or otherwise associated with the first and second active materials, wherein the first active material and the second active material, prior to being formed into the composite material, have at least one surface property which is different, one from the other.

In one embodiment of the above aspect, the metal-coordination complex is associated with the first and second active materials via an intermediary agent, such as, for example, a binder.

The composite material of the third aspect may be formed, at least in part, from the composite precursor formulation of the first aspect.

The skilled addressee will appreciate that such composite or nanocomposite materials can be used, in one non-limiting embodiment, to form at least a part of a conductive interface. In one embodiment, the composite precursor formulation can be used to form one or both of an anode or a cathode electrode, and may be formed from one or more active materials, such as those previously described for the first aspect, that are typically used for either. The composite material, in this embodiment, will therefore be a component of the electrode, such as the coating on the charge collecting substrate. Whether anode or cathode, the use of a metal-coordination complex improves the homogeneity of the electrode material, which is believed to result in improved performance and batch reproducibility of the battery and other energy storage devices using such nanocomposites.

The resilience the metal-coordination complex imparts to the active materials to which it is bound and the inherent conductivity of the metal-coordination complex lend it to particular efficacy in conductive interfaces.

In a fourth aspect, the invention resides in a method of forming a conductive interface between two or more active materials, or between at least one active material and a substrate including the steps of: (i) contacting at least one of the active materials and/or the substrate with a metal-coordination complex; and (ii) mixing active materials or mixing or coating the substrate with the at least one active material, to thereby form the conductive interface, and wherein at least two of the active materials or one of the active materials and the substrate have at least one surface property which is different, one from the other.

In a fifth aspect, the invention resides in a conductive interface comprising (i) an active material composite comprising at least two active materials and a metal-coordination complex in contact with the active materials; or (ii) an active material mixed with or coated onto a substrate and a metal-coordination complex in contact with the active material and/or the substrate.

The following comments apply equally to the fourth and fifth aspects.

It will be appreciated that the method of the fourth aspect may result from use of the composite precursor formulation of the first aspect. That is, when the method forms a conductive interface from at least two active materials then those active materials will have surface properties which differ, one from the other, as described for the first aspect. When the method of the fourth aspect employs one active material and a substrate then the active material will preferably have at least one surface property which differs from that of the substrate (the substrate may therefore be considered to be a particular class of active material in this aspect).

Further, when the conductive interface is formed by the method of the fourth aspect it may be formed from or comprise the composite material of the third aspect. That is, the conductive interface may comprise the first and second active materials (one of which is, in this aspect, the substrate) which, with the metal-coordination complex, form the composite material. In this embodiment, the composite material is conductive to thereby form the conductive interface.

In any embodiment of the fourth and fifth aspects, the conductive interface is one which provides for the flow of electrons and/or ions therethrough.

In one embodiment of the fourth and fifth aspects, the conductive interface is part of an electrode or a semiconductor.

Preferably, the conductive interface of the fifth aspect is formed by the method of the fourth aspect.

Regardless of which of the active material or substrate the coating of metal-coordination complex is applied to, or even if it should be applied to some supplementary binder material prior to contact with either the active material or substrate, the conductive interface that is formed is stronger and/or maintains excellent conductivity in use compared with identical interfaces formed without inclusion of the metal-coordination complex.

In relation to any of the above aspects, broadly, the metal-coordination complex includes a metal ion having one or more co-ordination sites occupied by a ligand, and one or more co-ordination sites available for binding to the active material and/or substrate of the conductive interface.

Preferably, the metal-coordination complex is coated onto the active material such that the metal-coordination complex includes at least one ligand datively bonded to the metal ion of the complex and the metal ion has a dative bond to the surface of the active material.

In one embodiment, the metal-coordination complex can form a dative bond to a further component of the conductive interface. Such further components may include a current collector, a further active material or a binder material. Regardless of the component's nature, the metal-coordination complex will be capable of forming a dative bond with such material surfaces to form a conductive adhesion interface. While some materials, such as metals and plastics, are thought not to have the potential to form dative bonds, they will commonly have oxygen species on their surface as a consequence of being in an oxygen containing atmosphere.

In one embodiment, the substrate may be a separator. The separator may be constructed of polypropylene or other materials such as are in common usage to separate electrodes.

In a further embodiment, an additional substrate may be present and may, in one embodiment, be a further separator such as are known in current batteries.

The separator may comprise nonwoven fibers, polymers, polymer films and naturally occurring substances. In one embodiment, the separator may be selected from the group consisting of cotton, nylon, polyesters, glass, polyethylene, polypropylene, polytetrafluoroethylene, PVC, rubber, asbestos and wood.

Advantageously, in relation to the fourth and fifth aspects, a coating of metal-coordination complex around the particles of the active material acts to maintain a conductive interface, when coated onto a charge collector electrode substrate to form an electrode, despite the strain imposed on the system as a result of cyclic intercalation of electrolyte such as, for example, small charge carrying ions including lithium which are typically used in electrochemical cells. That is, the metal-coordination complex coating acts to mitigate the stresses and strains associated with the expansion and contraction of the active material by effectively bridging the surface of the material to the current collector and minimising or preventing deterioration and breakup of the contact between the materials. This unexpected effect can provide for a long cycle life for active materials having higher energy densities, faster charge and discharge cycles.

Such coatings of active materials have not been previously used to form stronger adhesion layers at their interface with other materials, when forming a conductive interface, which is a particularly desirable requirement if changes in the physical dimensions of the active material are likely to occur, such as cyclical swelling and shrinking. Further, conductive metals such as aluminium, copper and silver can oxidise readily at their surface and an oxidized layer will lead to poorer conductivity. Further, conductive polymers such as polyacetylenes, polypyrroles, polyanilines, etc., do not easily form binding interactions due to a lack of suitable functionalities. As opposed to passive binding, a strong binding interface formed when employing a metal-coordination complex that can consistently maintain conductance is desirable in many applications requiring a pre-determined electron and/or ion flow.

In one embodiment, the substrate may be mixed with the active material. The metal-coordination complex may have been applied to or contacted with either or both of the substrate and active material. For example, the substrate may be polypropylene fibres to form a separator. These may be contacted with the metal-coordination complex prior to being mixed or otherwise contacted with an active material.

In an embodiment, the particles of the active material are at least partially coated by the metal-coordination complex. However, in an alternative embodiment the particles of the active material are substantially fully coated with the metal-coordination complex. It is not critical whether one or the other of the active material or the substrate forming the conductive interface is initially coated with the metal-coordination complex, or that the interface is formed prior to application of the metal-coordination complex. As discussed previously, a dative bond of the metal-coordination complex is enhancing the stability of the interface and this can be formed in a number of ways.

In one embodiment of the fourth aspect, the active material(s) and/or the substrate are contacted with the metal-coordination complex prior to the active material(s) being mixed or the active material being coated onto the substrate. While the metal-coordination complex may be contacted with the active material and/or the substrate following coating of the active material onto the substrate, it is preferred that the active material and/or the substrate, particularly the active material, are contacted with the metal-coordination complex prior to coating of the active material onto the substrate.

In certain embodiments, the conductive interface may comprise a conductive material and a non-conductive material comprising a porous or fibrous structure to thereby allow ion or electron transfer in an electrolyte. Either the active material or the substrate may be formed from such conductive materials or non-conductive materials.

While most of the discussion herein relates to one active material being mixed with a different active material or coated onto a substrate, it will be clear to the skilled addressee that these embodiments are exemplary and are not intended to be limiting upon the scope of the present invention. It will be understood that multiple interfaces comprising, for example, first and second active materials and substrates, second and third active materials and substrates, third and fourth active materials and substrates, and so on, may also be included. While the first active material or substrate is coated with metal-coordination complex, it will be appreciated that the second, third, and fourth active materials and/or substrates may be present as part of a conductive interface in any combination of coated or uncoated. The active materials and substrates comprising 1, 2, 3 or more layers maybe in any shape (films, strips, etc.) and thickness as required by the application as long as at least one interface is stabilised by dative bonds of a metal-coordination complex, in the manner described above.

The metal-coordination complex can be coated or applied onto the active material to form a thin film on the surface of that active material. The film may be formed as a monolayer. However, thicker films can also be prepared if required. Depending on the formulations used, the thickness of these coatings may be increased. This may be achieved by forming a thicker layer of the metal-coordination complex, such as to form a lattice of the metal-coordination complex on the surface of the active material, and/or by applying further coating layers, such as additional metal-coordination complexes, polymer, or binders to form a multi-layered laminate structure on the surface of the active material. The additional coating layers may be useful in changing the overall coating properties. Thus the properties of the active material and the structure comprising the conductive interface can be tuned by controlling the thickness of the layer of the metal-coordination complex.

In one embodiment, the layer of the metal-coordination complex formed on either the active material(s) or the substrate is less than about 250 nm thick, preferably less than about 100 nm, more preferably less than about 50 nm, even more preferably less than about 20 nm, still even more preferably less than about 10 nm, and most preferably less than about 5 nm.

The metal-coordination complex can coordinate to any electron-donating groups on the surface of, preferably, the active material(s) to bind the metal-coordination complex to the active material(s). Accordingly, at least one active material includes a surface having electron-donating groups, and the metal ions of the metal-coordination complex layer are bound via a dative bond to these electron-donating groups of the active material, as will be described herein.

In certain embodiments, the active material is in the form of a population of particles. This population may be processed to form a slurry, which may include binders, and which is subsequently applied to a contiguous substrate surface such as copper, aluminium or another conductive or semi-conductive substrate. The active material or substrate may be non-conductive, as discussed, but its structure (for example, its porosity) allows electron and/or ion diffusion. The metal-coordination complex may be mixed in with the active material slurry and binder and so forms a coating or layer around the active material particles with bonds available thereto and additionally to the binder and, following coating onto the substrate, the substrate surface.

The skilled addressee will appreciate that when the conductive interface is part of an electrode, then the electrode may be an anode or a cathode and may be formed from materials (forming the active material and substrate) that are typically used for either. In either case, the active material includes a surface, typically the surface presented by particles thereof, and the metal ion of the metal-coordination complex is able to form a dative bond with that surface. Preferably, the surface of the active material comprises a nitrogen, oxygen, sulfur, hydroxyl, or carboxylic acid species having a lone pair of electrons for forming the dative bond. Most preferably, the surface includes an oxygen species. Oxygen species are preferred as generally, the surface of the active material can be easily oxidised to include an oxide layer, if required, or may functionally be considered an oxide. Thus, in a preferred embodiment the surface of the active material is an oxide or partially oxidised surface.

In an embodiment, the substrate may be selected from the group consisting of metals, intermetallic compounds, metalloids, porous polymers and conductive polymers. Preferably, the substrate is selected from the group consisting of aluminium, copper, silver, gold, platinum, iron, zinc, nickel, and their alloys or conductive polymers or any other conductive material. Suitable conductive polymers may include polyacetylenes, polypyrroles, polyanilines, poly(p-phenylene vinylene), poly(alkylthiophenes), poly(3,4-ethyylenedioxythiophene), polycarbazoles, polyindols, polyazepines, polyfluorenes, polyphenylenes, polypyrenes, polyazulenes, polynaphthalenes and their copolymers. Preferably, when the conductive interface is part of an electrode, the substrate is copper when the electrode is an anode, and is aluminium when the electrode is a cathode.

When the conductive interface is part of a semiconductor arrangement then the active material(s) may be formed from any suitable semiconductor material comprising two or more elements. In one embodiment, at least one of the elements is a group III element selected from the group consisting of indium, aluminium and gallium and another may be a group V element selected from the group consisting of nitrogen, phosphorus, arsenic and antimony. In certain embodiments, the active material is a group III nitride, group III arsenide, group III arsenide nitride or group III arsenide-phosphide. In certain embodiments, each active material is selected from the group consisting of gallium nitride, indium gallium nitride, aluminium indium gallium nitride, indium aluminium nitride, aluminium gallium nitride, indium gallium arsenide, indium gallium arsenide nitride, aluminium indium gallium arsenide nitride indium gallium phosphide, indium gallium arsenide phosphide, indium arsenide phosphide, indium aluminium arsenide, indium aluminium gallium arsenide, titanium nitride, tantalum nitride, titanium oxide, tantalum oxide, silicon nitride, silicon dioxide, crystalline and amorphous silicon doped with boron, phosphorous and arsenic, and copper, aluminium, gold, silver and its alloys.

Substrates suitable for a semiconductor arrangement may include sapphire, zinc, glass and other silicon based substrates. Where several semiconductor chips are stacked together to form one combined system, active materials on a substrate, in turn, can become the substrate for the next incoming active material.

Potential uses and advantages of conductive (which term explicitly includes semiconductor interfaces) interfaces of the invention, comprising the metal-ligand complex as previously described, in semiconductor applications may include but are not limited to (i) use as an adhesion layer between the chip backside (for example materials such as aluminium, copper, aluminium copper, gold or bare crystalline and amorphous silicon, GaN, GaAs) and PVC foil; (ii) as a conductive material between two actives (for example two or more semiconductor chips i.e. chip on chip assembly); and (iii) as an adhesion promoter between a ceramic or copper substrate and a semiconductor backside.

In one embodiment of any one or more of the aspects described herein, when the active material comprises both silicon nanopowder and a conductive carbon black then the substrate may optionally not be copper foil.

In a further embodiment, when the active material further comprises a binder then, when the active material comprises both silicon nanopowder and a conductive carbon black and the substrate is a copper foil, the binder may optionally not be Poly(acrylic acid) (PAA).

In one embodiment of the present invention, optionally neither the first nor the second active material is a metalloid.

It will be appreciated that the metal-coordination complex used as a component of a conductive interface, for example within an electrode or including electrode-separator interfaces, provides certain advantages in operation and in particular to improve adhesion of active materials or of the interface to the underlying substrate. In various embodiments, the conductive interfaces formed in accordance with the fourth aspect may: (i) improve physical adhesion or binding of the active materials to each other and to the underlying substrate; (ii) improve or increase ionic and electrical conductivity at the conductive interface; (iii) improve or maintain the stability of the active material; (iv) decrease the solubility of certain electrode materials; (v) increase the cycle life of batteries, and (vi) reduce overall battery waste.

The fourth and fifth aspect will now be described with particular reference to forming conductive interfaces within silicon anodes. However, it will be appreciated that the underlying concepts are applicable, but not limited to, any other conductive interfaces of structures used in a variety of applications where adhesion and maintenance of conductivity at the interface is of importance.

Silicon anodes including the metal-coordination complex can be produced in a variety of ways. As an example, in one production method for silicon anode slurries three components are employed: (i) silicon particles, (ii) carbon/graphite particles, and (iii) a binder such as polyacrylic acid (PAA). Slurries are then bound to current collectors. The metal-coordination complex can be added to the silicon particles to form an activated silicon material which may then be combined with carbon particles and PAA. Alternatively, or additionally the carbon particles may be coated with the metal-coordination complexes and then combined with the silicon particles and PAA. Alternatively, the metal-coordination complex may be added to the binder to form a metal-ligand-binder complex that is then combined with the silicon and carbon particles. Alternatively, the metal-coordination complex may be added directly to, and mixed with a pre-existing mixture of the silicon particles, carbon particles, and PAA. Alternatively, the silicon particles and carbon particles and/or binders may all be coated with the metal-coordination complex, and, optionally, metal-coordination complexes of differing nature can be used according to the particular active material being coated.

Similarly, in binding metal-coordination complex associated slurries to current collectors, the current collector itself may be pre-activated with one or more metal-coordination complexes.

In the case of silicon based anodes, the ability of the metal-coordination complex to form dative bonds with adjacent atoms give rise to a stabilised structure with an ability to form and reform those bonds within a dynamic chemical environment. Both the anode and the cathode electrodes allow lithium ions to move in and out of the interiors of the active particles that constitute those electrodes. During insertion (or intercalation) ions move into the electrode. During the reverse process, extraction (or deintercalation), ions move out of the electrode. When a lithium-ion based cell is discharging, the positive lithium ion moves from the negative electrode (in this case silicon based) and enters the positive electrode (a lithium containing compound). When the cell is charging, the reverse occurs.

It will be clear then that when building a charge, the silicon must swell to store the lithium ions. The swelling that accompanies lithium absorption has always been a challenge when designing high-capacity lithium-ion anode materials. Silicon has amongst the highest capacity among lithium-ion storage materials, but it swells to 3-4 times its volume when fully charged. This swelling quickly breaks the electrical contacts in the anode. Metal-coordination complexes as described herein form coordination forces between the various components of the silicon anode material. It is believed that this combined binding can resist expansion and contraction within the active material. Further, even if there is breakage of some of these coordination bonds during expansion, the coordination bonds can reform after contraction. Additionally, the same benefits apply to the active material and current collector conductive interface to prevent delamination of active material off the current collector. Consequently, the fourth aspect provides for a conductive interface which may be used to form an electrode of higher stability and longer life. Further, the metal-coordination complex encourages electrons to move freely.

The benefits of metal-coordination complex coatings are not restricted to anodes. The same challenges around maintaining a good conductive interface are faced with cathodes and the benefits described above, of the use of a metal-coordination complex, also allow for more effective performance of cathodes.

The following comments regarding the metal-coordination complex, associated ligands and binding thereof, apply to all of the first to the sixth aspects.

In an embodiment, the metal ion of the metal-coordination complex is selected from the group consisting of chromium, ruthenium, iron, cobalt, aluminium, zirconium and rhodium.

Preferably, the metal ion is chromium.

The metal ion may be present in any applicable oxidation state. For example, chromium is known to have the following oxidation states of I, II, III, IV, V, or VI.

In an embodiment in which the metal ion is a chromium ion, it is preferred that the chromium has an oxidation state of III.

The metal ion may be associated with a counter-ion, such as an anion selected from the group consisting of chloride, acetate, bromide, nitrate, perchlorate, alum, fluoride, formate, tetrafluoroborate, hexafluorophosphate and sulphate, which can be co-ordinating or non-coordinating (weakly coordinating). In one embodiment the counter-ion is a non-coordinating anion. In another embodiment the counter-ion is a coordinating anion.

In certain embodiments, mixtures of different metal ions may be used, for example, to form a plurality of different metal-coordination complexes. In such cases, it is preferred that at least one metal ion is chromium.

Metals are known to form a range of metal-coordination complexes. Preferred ligands for forming the metal-coordination complex are those that include nitrogen, oxygen, or sulfur as dative bond forming groups. More preferably, the dative bond forming groups are oxygen or nitrogen. Even more preferably, the dative bond forming group is an oxygen-containing group. Still even more preferably, the oxygen-containing group is selected from the group consisting of oxides, hydroxides, water, sulphates, phosphates, or carboxylates.

The metal-coordination complex can also be further stabilised by cross-linking the metal ions of individual complexes with each other to form larger oligomeric metal-coordination complexes. Thus, in one embodiment the metal-coordination complex is an oligomeric metal-coordination complex. Preferably, the oligomeric metal-coordination complex is a chromium (III) oligomeric metal-coordination complex.

In one embodiment, the metal-coordination complex comprises, as a ligand, a bridging compound that is datively bonded to at least two metal ions. Preferably, this results in the formation of the oligomeric metal-coordination complex.

In certain embodiments, mixtures of different ligands may be used to form the metal-coordination complex or complexes. The different ligands may have different functions, for example, to form a plurality of different metal-coordination complexes, to bridge between metal-coordination complexes, to cross-link metal ions, or to provide a surface for forming a dative bond with various components of the composite.

In one exemplary embodiment, the metal-coordination complex is an oxo-bridged chromium(III) complex. This complex may optionally be further oligomerised with one or more bridging couplings such as carboxylic acids, sulphates, phosphates and other multi-dentate ligands.

The metal-coordination complex will be discussed below, in terms of available variations in the synthetic approach and the potential for differences thereby achieved in the final product.

The metal-coordination complexes can be formed by providing conditions for forming electron donating groups for bridging or otherwise linking or bonding two or more metal ions. This can be done by providing a pH below pH 7 such as below pH 6 or below pH 5, preferably between about 1.5 to 7, or about 2 to 7, or about 3 to 7 or about 4 to 7, or about 1.5 to 6, or about 2 to 6, or about 3 to 6 or about 4 to 6 to the composition formed from the contact of the metal-coordination complexes with the surface of the active material.

Various chromium salts such as chromium chloride, chromium nitrate, chromium sulphate, chromium perchlorates, may be used to form the metal-coordination complex. These salts are mixed with an alkaline solution, such as potassium hydroxide, lithium hydroxide, sodium bicarbonate, sodium sulphite and ammonia to form different metal-coordination complexes. Organic reagents that can act as bases such as ethylene diamine, bis(3-aminopropyl)diethylamine, pyridine, imidazoles, can also be used. The size and structure of the metal-coordination complex can vary with pH, temperature, solvents and other conditions.

In particular, by changing the metal salts and reaction environment, it is possible to modulate the binding of the metal-coordination complex to oxides (such as silica) and other solid substrates, and to present a coordination layer to bind differing active materials within a formulation which would otherwise not disperse homogeneously. While individual coordination interactions between the metal-coordination complex and a given active material are relatively weak, the multiplicity of coordination forces leads to a very strong interaction. Individually, each coordination interaction is likely to break as a result of a local stressor at some point. However, it is most unlikely that a local stressor will break all or even the majority of the plurality of coordination bonds. Therefore, on relaxation or removal of the stressor, the broken bonds can reform.

Oligomeric metal-coordination complexes can be pre-formed and applied to the liquid carrier, or formed in-situ in the presence of the active materials. In this embodiment, the ligands are able to form multiple dative bonds with multiple metal ions, to effectively bridge or cross-link the metal ions. That is, the ligand may form dative bonds with two or more metal ions, thereby linking one metal ion to another metal ion.

Exemplary oxo-bridged chromium structures are provided below:

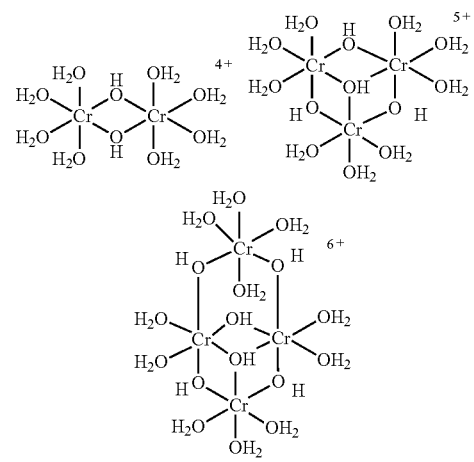

On application to the liquid carrier in the presence of at least one of the first or second active material and/or substrate, at least one of the water or hydroxyl groups on each of the metal-coordination complexes is replaced by a dative bond with the surface of the active material. This is illustrated below wherein "X" represents the dative bond to the surface of the active material.

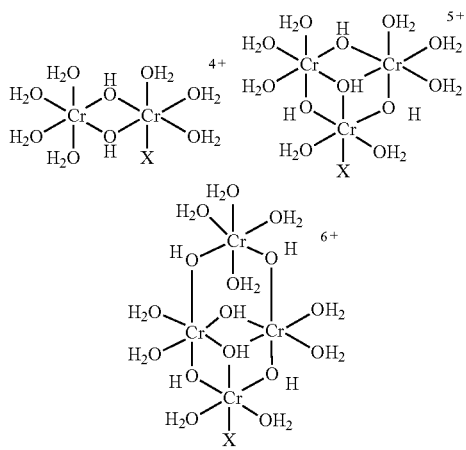

It will also be appreciated that multiple water or hydroxyl groups may be replaced by a dative bond with the surface of one of the first or second active materials or the substrate, for example each chromium ion may form a dative bond with the surface of the active material or substrate.

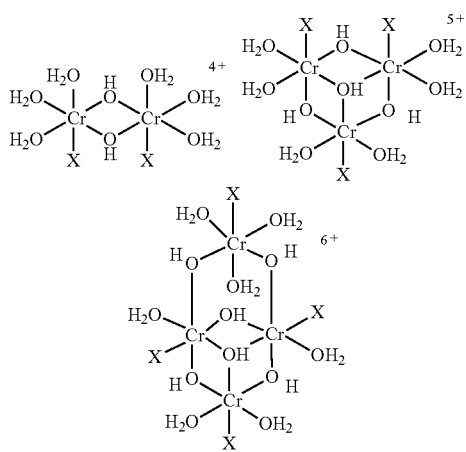

In addition, the water and/or hydroxyl groups may be replaced by a dative bond with an additional component of the formulation, such as a further active material or binder.

In a sixth aspect, the invention resides in a method of fabricating an electrode comprising a conductive interface, the method including the steps of (i) providing an electrode substrate and an active material; (ii) contacting one or both of the electrode substrate and the active material with a metal-coordination complex; and (iii) coating the electrode substrate with the active material, to thereby form the electrode.

In an embodiment, the step of fabricating the electrode includes casting the electrode from a composite precursor formulation comprising the active material and metal-coordination complex. The precursor formulation comprising the active material may be formed as described in any one or more embodiments of the first and second aspects.

The conductive interface of the electrode may be formed at least in part from the composite precursor formulation of the first aspect or the composite material of the third aspect or the method of the fourth aspect. The materials and approaches may be as described previously for any of those aspects.

It will be understood that the invention disclosed and defined in this specification extends to all alternative combinations of two or more of the individual features mentioned or evident from the text or drawings. All of these different combinations constitute various alternative aspects of the invention.

EXAMPLES

Example 1: Metal-Coordination Complex-Coated Silicon Nanoparticles

Preparation of Metal-Coordination Complex Solutions Using Different Salt and Base Combinations.

Solution 1

In this example, chromium perchlorate hexahydrate (45.9 g) was dissolved into 480 mL of purified water and mixed thoroughly until all solid dissolved. Similarly, 8 mL of ethylene diamine solution was added to 490 mL of purified water. The solutions were combined and stirred overnight at room temperature, and then left to equilibrate to a pH of approximately 4.5.

Solution 2

Similarly to the above, different ratios of chromium perchlorate and ethylenediamine solution can be used to generate solutions having a different pH such as pH 4.0, pH 5.0 or some other pH.

Solution 3

In this example, chromium chloride hexahydrate (26.6 gm) was dissolved into 500 mL into purified water and mixed thoroughly until all solid dissolved. The pH was adjusted slowly to pH 4.5 (or some other target pH) with 1M NaOH or LiOH.

Solution 4

In this example, chromium chloride hexahydrate (26.6 g) was dissolved into 480 mL of purified water and mixed thoroughly until all solid dissolved. Similarly, 8 mL of ethylene diamine solution (or other amounts) was added to 490 mL of purified water. The solutions were combined and stirred overnight at room temperature, and then left to equilibrate to a pH of approximately 3.8 (or other pH could be chosen if desired).

Solution 5

In this example, chromium perchlorate (45.8 g) was dissolved into 150 mL of isopropanol and mixed thoroughly until all solid dissolved. Similarly, 2-naphtholic acid (5.6 g) was suspended in 100 mL of isopropanol and finally pulverised potassium hydroxide (6.17 g) was slowly added with vigorous stirring. After forming a suspension, add drop wise the chromium perchlorate solution with stirring and then bring resultant mixture to reflux and maintain for at least 60 mins. The reaction when cooled forms a dark green coordination complex of chromic salt with 2-naphtholic acid. Similarly, other conjugated acids having conductive potential can be incorporated into metal-coordination complexes by the above method.

Example 2: Metal-Coordination Complex Activated Current Collectors

Preparation of Metal-Coordination Complexes on Copper and Aluminium Current Collectors After pre-washing with acetone and ethanol, copper and aluminium current collectors were treated with 5 mM metal-coordination complex solutions such as those described in Example 1. To obtain the required working concentration, metal-coordination complex examples using Solutions 1 to 3 were diluted in water while examples such as in Solution 4 were dissolved in isopropanol/water (1:1). The current collectors were left to stand in the various metal-coordination complex solutions for 1 hr, washed with either water or isopropanol/water (1:1), and either dried for 1 hr or overnight in a desiccant cabinet prior to further treatment.

The metal-coordination complex coated current collectors were then left to stand in polymers, particles or other components comprising active materials. As an example, in the case of polymers such as polyacrylic acd (PAA), a 1% solution of PAA in water was prepared and current collectors submerged in solution for 1 hr. After washing extensively with water, these modified current collectors were dried in air for at least 1 hr, and compared to those not treated with metal-coordination complex binders.

Contact Angle Analysis of Metal-Coordination Complex Treated and Non-Treated Current Collectors.

Figure 2:
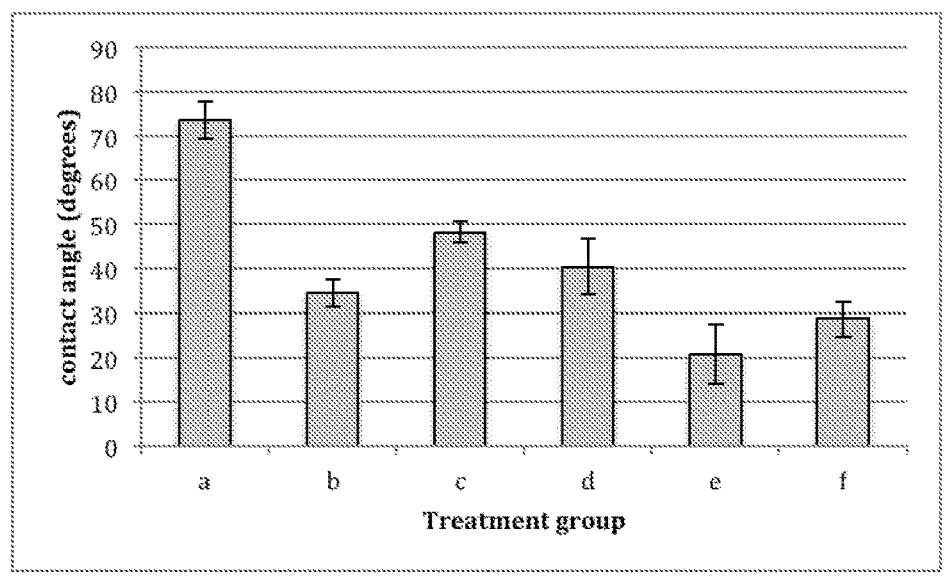
FIG. 2 is a set of Contact Angle (θ) measurements performed on aluminium current collectors as follows, a. Control 1 (treated with water instead of metal-coordination complex, b. treated with metal-coordination complex at pH 4.5, c. treated with metal-coordination complex at pH 5.0, d. Control 2 (treated with water instead of metal-coordination complex and polyacrylic acid (PAA), e. treated with metal-coordination complex at pH 4.5, and PAA, f. treated with metal-coordination complex at pH 5.0, and PAA.

Contact Angle analysis was performed on a Dataphysics instrument using 20 μL drop of milliQ water onto the surface of both metal-coordination complex treated and untreated current collectors. Replicates between 9 to 12 repeat contact angle measurements were performed. As shown in FIGS. 1 and 2, metal-coordination complex treated copper and aluminium current collectors both gave significant differences in wettability, and polyacrylic acid (PAA) binding as shown by the contact angle (θ) changes. Untreated copper current collectors are relatively hydrophobic as shown by its high contact angles (θ=>80°) but on metal-coordination complex treatment the contact angles drop significantly. It is interesting to note that wettability and binding to polyacrylic acid of the copper surface is affected by the pH in which the metal-coordination complex is formed (which affects the oligomer populations in the metal-coordination complex solution) as well as, to some extent, the drying processes. Similar characteristics were seen with aluminium current collectors (FIG. 2).

Example 3: Composite of Silicon and Carbon Particles

Preparation of Metal-Coordination Complex Silicon Particles (1-3 μm)

In this example, a 50 mM (final concentration) metal-coordination complex solution was used. Silicon (Si) powder (1-3 μm in size) was purchased from US Research Nanomaterials, USA. A 20% w/w silicon slurry was prepared by ball-milling the 1-3 μm silicon powder with the metal-coordination complex solution in an alumina jar.

Preparation of Silicon Particles (without Metal-Coordination Complex)

A 20% w/w silicon slurry was prepared by ball-milling the 1-3 μm silicon powder with ddH$_2$O in an alumina jar.

Preparation of Composites of Silicon and Carbon Particles, with and without Metal-Coordination Complexes Metal-coordination complex-coated and non-coated silicon nanoparticles, as prepared above, were mixed with TIMCAL Graphite & Super P Conductive Carbon Black, purchased from MTI Corporation, USA and Poly(acrylic acid) (PAA) average M$_w$ 450,000 D, purchased from Sigma-Aldrich, USA. The silicon nanoparticles (with or without metal-coordination complex) were mixed with a mass of Super P Carbon equal to the dry weight of silicon nanoparticles. The slurry was diluted to 12.5% w/w solid content by adding ddH$_2$O. The alumina jars were placed in a ball-mill and run at 450 rpm for 56 hours. Enough of a 5% w/v Poly(acrylic acid) (PAA) average M$_w$ 450,000 D in ddH$_2$O solution was added to the slurry to achieve a mass of poly(acrylic acid) equivalent to half the mass of Super P Carbon and a solid content of 10% w/w. The slurry was ball-milled overnight at 200 rpm. This gave a slurry with a ratio of Si:Super-P:PAA at 40:40:20 (wt %). The amounts of Si, Super-P and PAA can be adjusted to give different ratios comprising the slurries. The slurries were thickened in an oven at 90° C. until a final solid content around 25% w/w was reached.

SEM Analysis of Silicon and Carbon Particle Composites, with and without Metal-Coordination Complexes.

Scanning Electron Microscopy (SEM) imaging and Energy Dispersive X-ray Spectroscopy (EDS) analysis was carried out using a JEOL 7001F. Secondary electron images (SEI), backscatter images (COMPO) and EDS data were collected.

Figure 3:
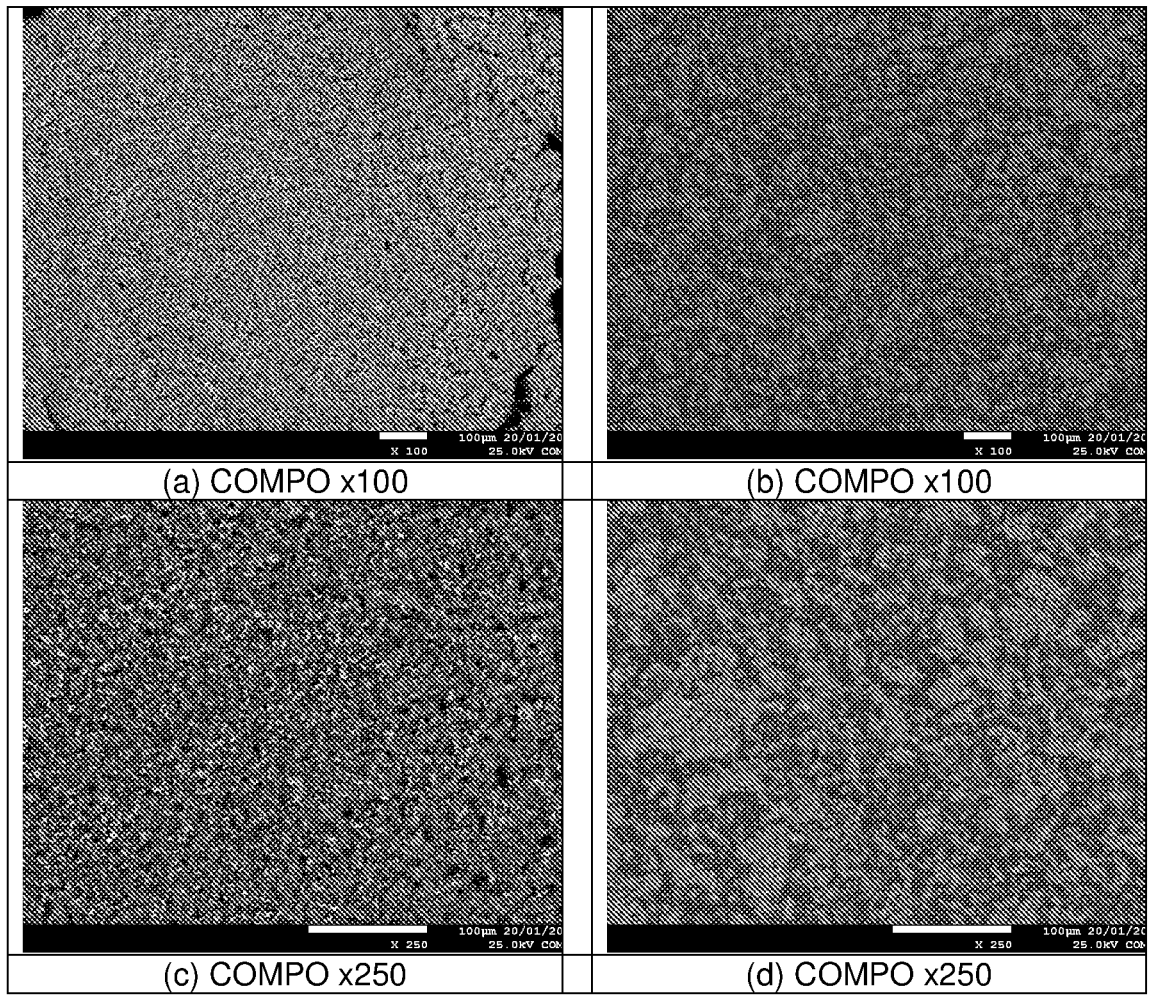
FIG. 3 a-d is a series of SEM images of silicon (1-3 μm) and carbon particle composite precursor formulations with metal-coordination complexes, (a) COMPO×100, (c) COMPO×250 magnification and, without metal-coordination complexes, (b) COMPO×100, (d) COMPO×250 magnification.

Slurries prepared with the metal-coordination complex clearly show a more homogeneous distribution of the particles (silicon appears brighter than carbon on backscatter images due to its higher atomic mass) with the white silicon evenly distributed (FIG. 3a and FIG. 3c) in a repeatable pattern that is not replicated in the slurry prepared without the metal-coordination complex (FIG. 3b and FIG. 3d).

Example 4: Composite of High-Capacity LiNiCoMnO2 Particles and Carbon Particles

Preparation of Metal-Coordination Complex Lithium Metal Oxide Particles

In this example, a 50 mM (final concentration) chromium metal-coordination complex solution was used. High-capacity lithium metal oxide (LiNiCoMnO2) particles was purchased from MTI Corporation, USA. A 10% w/w LiNiCoMnO2 slurry was prepared by adding 100 mM metal-coordination complex solution to the dry lithium metal oxide particles. The slurry was mixed overnight at 550 rpm using a magnetic stirrer. The overnight slurry was transferred into centrifuge tubes and centrifuged at 4,000 g for 10 minutes to separate the solids from the solution. 90% of supernatant was removed from the starting volume and was replaced with ddH$_2$O at pH 4.5. The pellet was resuspended using physical agitation and bath sonication on high for 10 minutes. This wash step was repeated and following the second centrifugation step the supernatant was removed from the solution and replaced by 10% v/v isopropanol in ddH$_2$O to achieve a 10% w/w solid content slurry. The slurry was bath sonicated for another 10 minutes to fully disperse the particles.

Preparation of Composites of Lithium Metal Oxide and Carbon Particles, with and without Metal-Coordination Complexes Metal-coordination complex-coated Lithium Metal Oxide particles, prepared as described above, as well as untreated Lithium Metal Oxide particles were mixed with TIMCAL Super C45 Conductive Carbon Black, purchased from MTI Corporation, USA and Poly(acrylic acid) (PAA) average M$_w$ 450,000 D, purchased from Sigma-Aldrich, USA. The Lithium Metal Oxide particles (with or without metal-coordination complex) were transferred into a 250 mL Erlenmeyer flask with magnetic stirrer bar. Super C45 Carbon in a ratio to dry weight of Lithium Metal Oxide of 7:85 was added to achieve a 10% w/w solid content slurry. The slurry flask was placed on a magnetic stirrer and mixed overnight at 550 rpm. A 5% w/v Poly(acrylic acid) (PAA) average M$_w$ 450,000 D in ddH$_2$O solution was added to the slurry in a ratio of 8:7 to Super C45 Carbon and give a solid content of 8.5% w/w. The slurry was allowed to mix overnight at 550 rpm. The slurry has a ratio of LiNi- CoMnO2:Super-C45:PAA of 85:7:8 (wt %). The amounts of Si, Super-C45 and PAA can be adjusted to give different ratios comprising the slurries. The slurries were thickened in an oven at 90° C. until a final solids content of around 15% w/w was reached.

SEM Analysis of Lithium Metal Oxide and Carbon Particle Composites, with and without Metal-Coordination Complexes.

Scanning Electron Microscopy (SEM) imaging and Energy Dispersive X-ray Spectroscopy (EDS) analysis was carried out using a JEOL 7001F. Secondary electron images (SEI), backscatter images (COMPO) and EDS data were collected.

Figure 4:
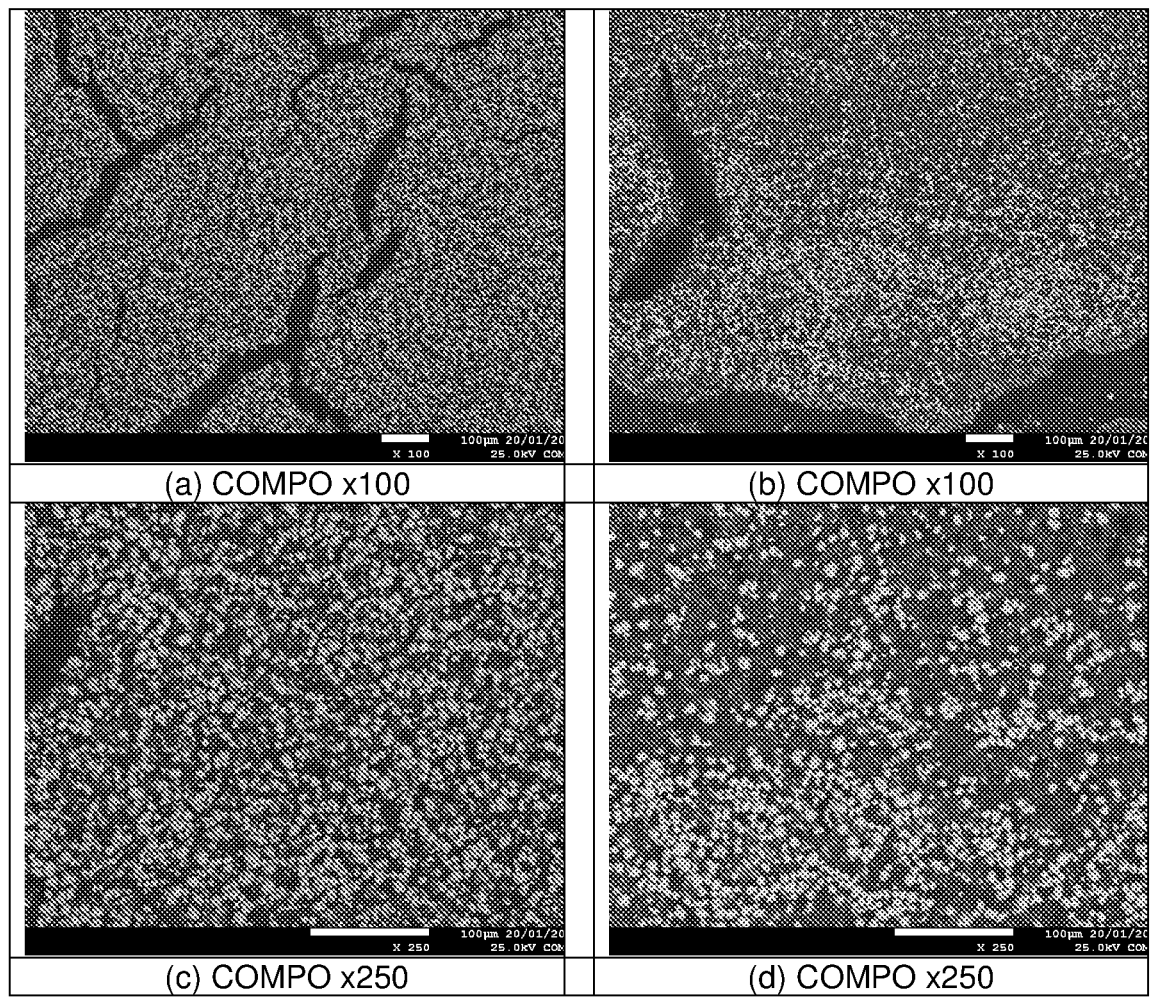
FIG. 4 a-d is a series of SEM images of high-capacity LiNiCoMnO2 and carbon composite precursor formulations with metal-coordination complexes, (a) COMPO×100, (c) COMPO×250 magnification and, without metal-coordination complexes, (b) COMPO×100, (d) COMPO×250 magnification.

It can be seen that the slurry prepared with the metal-coordination complex showed a more homogeneous distribution of the particles (LiNiCoMnO2 appears brighter than Carbon on backscatter images due to its higher atomic mass) with the white LiNiCoMnO2 evenly distributed (FIG. 4a and FIG. 4c) in a repeatable pattern that is not replicated in the slurry prepared without the metal-coordination complex (FIG. 4b and FIG. 4d).

Example 5: Composites of Silicon (100 nm) and Carbon Particles

Preparation of Metal-Coordination Complex Silicon Particles.

In this example, a 50 mM (final concentration) metal-coordination complex of Solution 1, as described above, was used. Silicon (Si) nanopowder (100 nm in size) was purchased from MTI Corporation, USA. A 20% w/v silicon nanoparticle slurry was prepared by mixing the dry silicon nanopowder with a pH 4.3 7.5% isopropanol solution in ddH$_2$O. The slurry was placed under vacuum for 5 minutes before 100 mM metal-coordination complex solution was added. The flask was heated to 40° C. and the slurry was mixed at 400 rpm for 5 minutes by a mechanical overhead mixer. After mixing, the solution was vacuumed for another 10 minutes. The slurry was further allowed to mix at 40° C. at 400 rpm overnight. The slurry was centrifuged at 10,000 g for 10 minutes to separate the solids from the solution. 70% of supernatant was removed from the starting volume and was replaced with ddH$_2$O at pH 4.3. The pellet was resuspended using physical agitation and bath sonication for 10 minutes. This wash step was repeated and following a third centrifugation step the supernatant was removed from the solution. ddH$_2$O at pH 4.3 was added to the slurry until a 20% w/v solid content was reached. The slurry was bath sonicated for another 10 minutes to fully disperse the particles. Various concentrations of metal-coordination complex solutions combined with no or various number of wash steps can be used to coat the Si nanoparticles.

Charge and Surface Change Assessments of Si Nanoparticles by Zeta-Sizer.

The size and surface charge of the Silicon particles were assessed using Malvern® Zeta-sizer. Silicon nanoparticles as described above were either coated with metal coordination complexes or treated with ddH$_2$O (Control) using probe sonication. After centrifuging at 10000 rpm for 10 mins, the supernatant was removed and particles were re-dispersed with ddH$_2$O using probe sonication. This wash step was repeated total of 3 times and metal-coordination complex activated and non-activated particles were measured for size and zeta potential using a zeta sizer.

Figure 5:
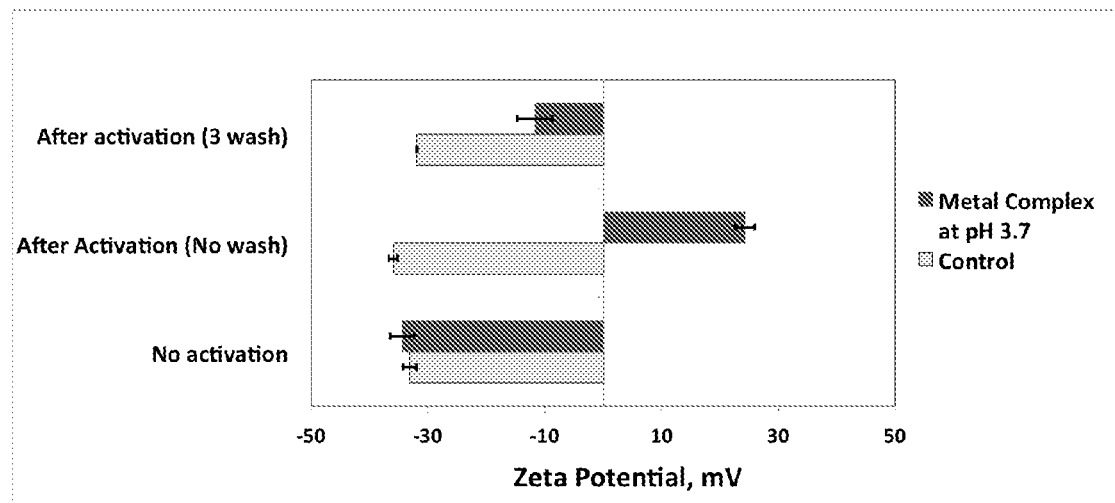
FIG. 5 shows the zeta potential data of silicon nanoparticles treated with metal-coordination complex formulations at pH 3.7. At this pH, the metal coordination complex does not form as stable a coating and after washing leads to a partially coated particle with poor coordination potential.
Figure 6:
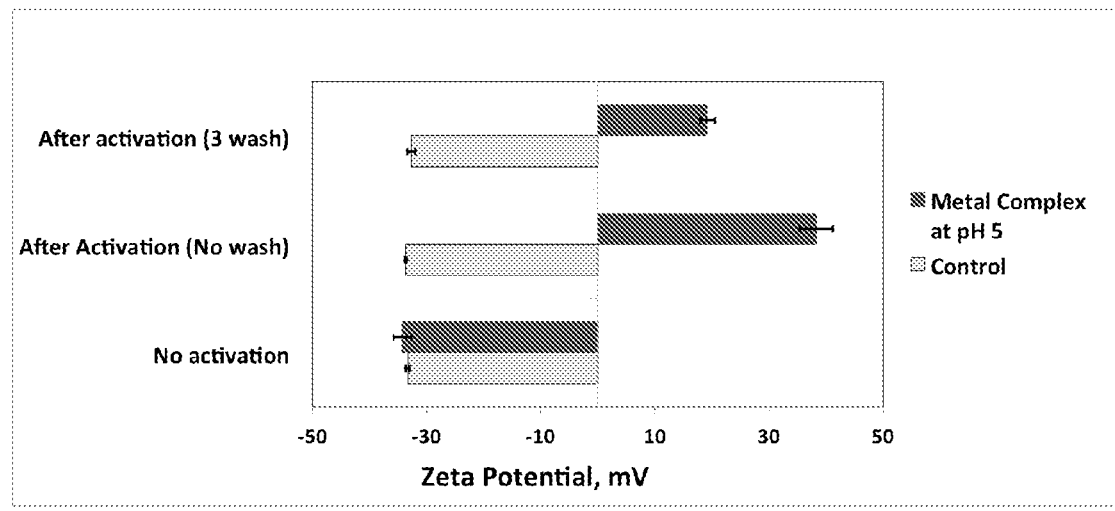
FIG. 6 shows the zeta potential data of silicon nanoparticles treated with metal-coordination complex formulations at pH 5.0. Si particles have a negative zeta potential as would be expected from the presence of electronegative Si—OH groups. Metal coordination complexes are electropositive and in effectively coating electronegative particles can form a net electropositive particle. Metal-coordination complexes adjusted to pH 5.0 generate a more stable electropositive Si nanoparticle with greater potential to coordinate to other particles or binders.

FIG. 5 and FIG. 6 show the zeta potential data of silicon nanoparticles treated with two metal-coordination complex formulations, formed at pH 3.7 and pH 5.0, respectively. Si particles have a negative zeta potential as would be expected from the presence of electronegative Si—OH groups. Metal-coordination complexes are electropositive and in effectively coating electronegative particles can form a net electropositive particle. The stability of these particles under rigorous washing can be seen between FIGS. 5 and 6. Metal-coordination complexes adjusted to pH 5.0 generate a stable electropositive Si nanoparticle with the potential to coordinate to other particles or binders. At pH 3.7, there is still metal-coordination complex on the silicon nanoparticle as shown by the decrease in electronegativity of the silicon nanoparticle. By controlling the type of metal complexes, as exemplified by the changes in pH, it is possible to change the surface properties of silicon nanoparticles from electronegative, to neutral and to electropositive particles.

Preparation of Composites of Silicon and Carbon Particles, with and without Metal-Coordination Complexes.

Metal-coordination complex-coated silicon nanoparticles as prepared above as well as untreated silicon nanoparticles were mixed with TIMCAL Graphite & Super P Conductive Carbon Black, purchased from MTI Corporation, USA and Poly(acrylic acid) (PAA) average M$_w$ 450,000 D, purchased from Sigma-Aldrich, USA. The silicon nanoparticles (with or without metal-coordination complex) were transferred into a side arm flask with magnetic stirrer bar. A mass of Super P Carbon equal to the dry weight of silicon nanoparticles was also transferred into the same flask. The slurry was diluted to 15% w/v solid content by adding 15% isopropanol in ddH$_2$O. The slurry flask was placed on a heated stirrer and mixed at 40° C. at 400 rpm for 5 minutes. The flask was placed under vacuum and continued mixing for another 5 minutes. The vacuum apparatus was removed and the slurry was left to mix for another hour. 450 kDa poly(acrylic acid) equivalent to half the mass of Super P Carbon was weighed out and added to the slurry. The slurry was allowed to mix overnight at 40° C. at 400 rpm. This gave a slurry with a ratio of Si:Super-P:PAA at 40:40:20 (wt %). The amounts of Si, Super-P and PAA can be adjusted to give different ratios comprising the slurries.

SEM Analysis of Silicon (100 nm) and Carbon Particle Composites, with and without Metal-Coordination Complexes.

Scanning Electron Microscopy (SEM) imaging was carried out as described before. It can be seen that the slurries prepared with the metal-coordination complex shows a smoother, more regular surface on SEI imaging (FIG. 7a) than the slurry prepared without the metal-coordination complex (FIG. 7b). The backscatter images confirm this observation (Silicon appears brighter than Carbon on backscatter images due to its higher atomic mass) with the white Silicon in the slurry prepared with the metal-coordination complex more evenly distributed (FIG. 7c) and less clustered than the slurry without (FIG. 7d).

Example 6: Fabrication and Testing of Si Anode with & without Metal-Complex in Coin Cells Preparation of Battery Slurries Metal-coordination complex-coated silicon nanoparticles (100 nm), and a battery slurry with a ratio of Si:Super-P:PAA of 40:40:20 (wt %) were prepared as outlined in Example 5. The amounts of Si, Super-P and PAA can be adjusted to give different formulations of slurries Fabrication of Metal-Coordination Complex Coated Si Anode in the Coin Cell Battery The Si slurries were cast onto copper (Cu) foil which was used as the current collector to form a Si electrode. The Si electrode was then dried under vacuum, calendered and cut for coin cell assembly. The analagous Si electrode with uncoated Si as the active material was also fabricated and used as a control which had similar mass loadings (2.22-2.37 mg/cm$^2$) as the metal-coordination complex coated Si electrode. Lithium (Li) metal was used as the counter electrode, and 1M LiPF$_6$/EC:DEC:DMC=1:1:1 with 10% FEC was used as electrolyte for coin cell assembly. For charge/discharge cycling tests, the coin cells were activated at 0.01 C (1 C=4,200 mAh/g) for 2 cycles and then cycled at 0.5 C (1 C=4,200 mAh/g) for long-term stability testing. The C rates were based on the mass of Si particles in the electrodes. The voltage range for charge/discharge tests was 0.005-1.50 V vs. Li. The charge/discharge tests were conducted on Neware multi-channel battery testers controlled by a computer. Three replicate cells were made and tested for each condition.

SEM Analysis and Photographs of Silicon (100 nm) Electrodes, with and without Metal-Coordination Complexes, Before and after Cycling.

FIG. 8 shows the secondary electron images (SEI) and backscatter images (COMPO) respectively for the Si (100 nm) electrode tapes, with (c and d) and without (a and b) metal-ligand complex, after casting slurries onto Cu-foil substrate. No cycling studies have been performed on these electrodes. Again, clear differences can be seen in terms of uniformity and dispersion of the mixed slurries, where the metal-coordination complex slurry shows better uniformity and dispersity, while the control slurry contains poorly dispersed agglomerates of Si particles (with lighter colour). Since all the slurries went through the same ball milling processing, the differences are believed to be due to the metal-coordination complex coatings on Si particles.

FIG. 9 shows the differences in surface morphology and electrode structure, with (c and d) and without (a and b) metal-coordination complex, for the electrode samples after hundreds of deep charge/discharge cycles. It can be seen that the electrode structure of the metal-coordination complex sample is better maintained, while the control sample shows more fragmentation and pulverisation of the particles. This indicates the advantages which flow both from the improved homogeneity of the composite precursor formulation and from the inclusion of the metal-coordination complex in the final composite material thereby formed.

FIG. 10 shows cross-sections for the metal-coordination complex (b) and control samples (a) after repetitive charge/discharge cycles. The electrode structure and integrity of the metal-coordination complex sample is significantly better maintained. As shown, the copper foil (top) has delaminated from the silicon active materials in the control sample while the electrode incorporating metal-coordination complex has the copper foil still binding to the silicon active materials. FIG. 11 shows photographs of silicon active materials with metal-coordination complex (b) and without i.e. control samples (a) from dismantled half coin cells after 1000 deep charge and discharge cycles (at 0.5 C, 1 C=4,200 mAh/g). The metal-coordination complex incorporated cells (b) remain intact while those without metal-coordination complex (a) show significant cracking and ease of removal from the copper foil.

FIGS. 12 (a), (b), (c) and (d) are SEM images of (a) 100×, (c) 250×, SEI mode of a dismantled electrode formed with metal-coordination complex and (b) 100×, (d) 250×SEI mode of a dismantled electrode formed in a similar manner but without metal-coordination complex. As before, SEM images were taken from dismantled half coin cells after 1000 deep charge and discharge cycles at 0.5 C, 1 C=4,200 mAh/g. The images on samples with metal-coordination complex display a hair-like structure corresponding to the battery separator made of fibres of polypropylene/polyethylene. In contrast, little or no separator fibres were observed when metal-coordination complex was not used. This indicates there is strong binding between the active material and the separator in the presence of the metal-coordination complex.

Example 7: Fabrication and Testing of LiNiCoMnO2 Cathode with & without Metal-Complex in Coin Cells Fabrication of Metal-Coordination Complex Coated Lithium Metal Oxide Cathode in Coin Cells Metal-coordination complex coated lithium metal oxide slurries were prepared as outlined in Example 4, and sent for electrode fabrication and coin cell assembly. The slurries were cast with a mass loading of 13 mg/cm2 onto Aluminum (Al) foil which was used as the current collector to form LiNiCoMnO$_2$ electrodes. Each LiNiCoMnO$_2$ electrode was then dried under vacuum, calendered and cut for coin cell assembly. Lithium (Li) metal was used as the counter electrode, 1M LiPF$_6$/EC:DEC:DMC=1:1:1 with 10% FEC was used as electrolyte and polypropylene/polyethylene separator was used for coin cell assembly. For charge/discharge cycling tests, the coin cells were activated at 0.02 C (1 C=150 mAh/g) for 3 cycles and then cycled at 0.1 C (1 C=150 mAh/g) for long-term stability testing (1000 cycles). The C rates were based on the mass of Si particles in the electrodes. The voltage range for charge/discharge tests was 2.5-4.2 V vs. Li. The charge/discharge tests were conducted on Neware multi-channel battery testers controlled by a computer. Three replicate cells were made and tested for each condition.

SEM Analysis and Photographs of Lithium Metal Oxide Electrodes, with and without Metal-Coordination Complexes, Before and after Cycling.

After 1000 deep cycles, the coin cells were dismantled. The LiNiCoMnO2 cathode electrodes were removed and analysed using Scanning Electron Microscopy (SEM) imaging and Energy Dispersive X-ray Spectroscopy (EDS) as described in Example 6.

FIGS. 13 (a) and (b) are photographs of LiNiCoMnO$_2$ materials with metal-coordination complex (a) and control samples (b) from dismantled half coin cells after 1000 deep charge and discharge cycles (at 0.5 C, 1 C=150 mAh/g). The metal-coordination complex incorporated cells (a) remain intact with residual separator material (white patches) while the control without metal-coordination complex (b) cracked and the majority of material simply dropped off the aluminium foil. FIGS. 14 (a) and (b) are SEM images of LiNiCoMnO$_2$ materials at 100×SEI mode of a dismantled electrode formed with (a) and without (b) metal-coordination complex. As shown before in the photograph (FIG. 13) there are patches of hair like structures of the separator (polypropylene/polyethylene fibres) on those examples with metal-coordination complexes. Only traces of such fibres were present in the examples without metal-coordination complexes.

Example 8: Forming GaN/Sapphire Interfaces

Gallium Nitride/Sapphire wafers obtained from Blue-Glass Ltd, NSW, Australia were broken up into small fragments and a portion of the fragments immersed in 5 mM metal-coordination complex solution for 1 hr, washed with ddH$_2$O for 30 sec, and then left to dry in a vacuum desiccator for 1 hr. Metal-coordination complex coated fragments and uncoated fragments (treated with water under similar conditions) were placed on top of an intact wafer to form an interface between the upper GaN (on bottom wafer) with the bottom sapphire (on the top wafer fragments). These stacked wafers were left at 700° C. for 15 mins.

After leaving the wafers to cool to RT, they were tilted whereupon it was observed the uncoated fragments immediately slid off the bottom wafer i.e. the temperature treatment alone did not result in any interface binding. The metal-ligand coated fragments did not slide off until the bottom wafer was tilted to almost 90°. Considering the metal-coordination complex forms only nanometre thin films, the difference in binding strength compared to uncoated controls to hold these wafers is significant and, it is believed, can be improved with more intimate incorporation of the metal-coordination complex into the films and interfaces.

The invention claimed is:

1. A method of fabricating an electrode comprising a conductive interface, the method comprising the steps of:
    (i) providing an electrode substrate and an active material; wherein the electrode substrate is a current collector substrate;
    (ii) contacting one or both of the current collector substrate and the active material with a metal-coordination complex; and
    (iii) following step (ii) coating the current collector substrate with the active material, to thereby form the electrode; wherein in the electrode the metal-coordination complex is in contact, through dative bonds, with the active material and the current collector substrate; wherein the active material further comprises a binder and wherein, when the active material additionally comprises both silicon nanopowder and a conductive carbon black and the current collector substrate is a copper foil, then the binder is not Poly(acrylic acid) (PAA).

2. The method of claim 1, wherein when the electrode is an anode the current collector substrate is a copper current collector substrate or wherein when the electrode is a cathode the current collector substrate is an aluminium current collector substrate.

3. The method of claim 1, wherein the active material is selected from silicon, carbon, and mixed metal oxides.

4. The method of claim 2, wherein the carbon is in a form selected from graphite, super-P carbon, graphene, carbon nanotubes, carbon nanofibers, acetylene carbon black, and Ketjenblack (KB).

5. The method of claim 2, wherein the mixed metal oxide comprises one or more of cobalt, lithium, nickel, iron and manganese.

6. The method of claim 1, wherein the metal-coordination complex comprises a metal ion which is a chromium ion.

7. The method of claim 5, wherein the chromium ion is a chromium (III) ion.

8. The method of claim 1, wherein the metal-coordination complex comprises a dative bond-forming atom selected from nitrogen, oxygen, and sulphur datively bonded to a metal ion.

9. The method of claim 1, wherein the metal-coordination complex is an oligomeric oxo-bridged chromium (III) complex.

10. The method of claim 1, wherein the binder is selected from the group consisting of polyvinylpyrrolidone, carboxymethylcellulose, polyacrylic acid (PAA), poly(methacrylic acid), maleic anhydride copolymers including poly(ethylene and maleic anhydride) copolymers, polyvinyl alcohol, carboxymethyl chitosan, natural polysaccharide, Xanthan gum, alginate, and polyimide.

11. The method of claim 1, wherein:
    (i) the current collector substrate is selected from the group consisting of aluminium, copper, silver and gold;
    (ii) the active material is a first and/or second active material, wherein the first and second active material is independently selected from the group consisting of: metals, metal oxides, ceramics, intermetallic compounds, metalloids, carbon, silicon, including its oxides, alloys, and composites, and, mixed metal oxides; and
    (iii) the metal-coordination complex comprises a metal ion which is selected from the group consisting of chromium, ruthenium, iron, cobalt, aluminium, zirconium, and rhodium ions.

12. An electrode comprising an active material coated onto an electrode substrate and a metal-coordination complex in contact, through dative bonds, with the active material and the electrode substrate; wherein the active material further comprises a binder; and wherein the electrode substrate is a current collector substrate;
    wherein, when the active material additionally comprises both silicon nanopowder and a conductive carbon black and the current collector substrate is a copper foil, then the binder is not Poly(acrylic acid) (PAA).

13. The electrode of claim 12, wherein when the electrode is an anode the current collector substrate is a copper current collector substrate or wherein when the electrode is a cathode the current collector substrate is an aluminium current collector substrate.

14. The electrode of claim 12, wherein the active material is selected from silicon, carbon, and mixed metal oxides.

15. The electrode of claim 14, wherein the carbon is in a form selected from graphite, super-P carbon, graphene, carbon nanotubes, carbon nanofibers, acetylene carbon black, and Ketjenblack (KB).

16. The electrode of claim 14, wherein the mixed metal oxide comprises one or more of cobalt, lithium, nickel, iron and manganese.

17. The electrode of claim 12, wherein the metal-coordination complex comprises a metal ion which is a chromium ion.

18. The electrode of claim 17, wherein the chromium ion is a chromium (III) ion.

19. The electrode of claim 12, wherein the metal-coordination complex comprises a dative bond-forming atom selected from nitrogen, oxygen, and sulphur datively bonded to a metal ion.

20. The electrode of claim 12, wherein the metal-coordination complex is an oligomeric oxo-bridged chromium (III) complex.

21. The electrode of claim 12, wherein the binder is selected from the group consisting of polyvinylpyrrolidone, carboxymethylcellulose, polyacrylic acid (PAA), poly(methacrylic acid), maleic anhydride copolymers including poly(ethylene and maleic anhydride) copolymers, polyvinyl alcohol, carboxymethyl chitosan, natural polysaccharide, Xanthan gum, alginate, and polyimide.

22. The electrode of claim 12, wherein:
    (i) the current collector substrate is selected from the group consisting of aluminium, copper, silver and gold;
    (ii) the active material is a first and/or second active material, wherein the first and second active material is independently selected from the group consisting of:

metals, metal oxides, ceramics, intermetallic compounds, metalloids, carbon, silicon, including its oxides, alloys, and composites, and, mixed metal oxides; and (iii) the metal-coordination complex comprises a metal ion which is selected from the group consisting of chromium, ruthenium, iron, cobalt, aluminium, zirconium, and rhodium ions.

* * * * *